United States Patent
Golding et al.

(10) Patent No.: US 9,605,114 B2
(45) Date of Patent: Mar. 28, 2017

(54) POLYPHOSPHAZENES

(71) Applicant: THE SECRETARY OF STATE FOR DEFENCE, London (GB)

(72) Inventors: Peter Golding, Reading (GB); Anthony John Bellamy, Shrivenham (GB); Alessandro Enzo Contini, Shrivenham (GB)

(73) Assignee: The Secretary of State for Defence, London (GB)

( * ) Notice: Subject to any disclaimer, the term of this patent is extended or adjusted under 35 U.S.C. 154(b) by 0 days.

(21) Appl. No.: 14/408,184

(22) PCT Filed: Jun. 20, 2013

(86) PCT No.: PCT/GB2013/000275
§ 371 (c)(1),
(2) Date: Dec. 15, 2014

(87) PCT Pub. No.: WO2013/190259
PCT Pub. Date: Dec. 27, 2013

(65) Prior Publication Data
US 2015/0144017 A1 May 28, 2015

(30) Foreign Application Priority Data

Jun. 21, 2012 (GB) .................. 1210980.7

(51) Int. Cl.
*C06B 45/10* (2006.01)
*F42B 3/113* (2006.01)
(Continued)

(52) U.S. Cl.
CPC ............ *C08G 79/025* (2013.01); *B01J 19/10* (2013.01); *C06B 45/105* (2013.01); *C06C 9/00* (2013.01); *C08G 59/4071* (2013.01); *C08L 85/02* (2013.01); *F42B 3/113* (2013.01); *B01J 2219/08* (2013.01)

(58) Field of Classification Search
CPC ......... F42B 3/113; C06B 45/10; C06B 45/105
See application file for complete search history.

(56) References Cited

U.S. PATENT DOCUMENTS 3,844,983 A 10/1974 Reynard et al.
3,948,820 A 4/1976 Reynard et al.
(Continued)

FOREIGN PATENT DOCUMENTS

EP 0014865 A1 9/1980
GB 1597698 A 9/1981
(Continued)

OTHER PUBLICATIONS

Allcock, Harry R. et al., "Second-Order Nonlinear Optical Poly(organophosphazenes): Synthesis and Nonlinear Optical Characterization," Macromolecules, 1991, pp. 1000-1010, vol. 24, American Chemical Society.
(Continued)

*Primary Examiner* — Aileen B Felton
(74) *Attorney, Agent, or Firm* — Dean W. Russell; Elena S. Polovnikova; Kilpatrick Townsend & Stockton LLP

(57) ABSTRACT

Optically sensitized binders which are energetic polyphosphazenes tailored at the molecular level to achieve enhanced absorption of electromagnetic radiation by having attached thereto a chromophore to absorb light and therefore ignite the binder in use.

25 Claims, 7 Drawing Sheets

(51) Int. Cl.
*C08G 79/025* (2016.01)
*C08G 59/40* (2006.01)
*C08L 85/02* (2006.01)
*C06C 9/00* (2006.01)
*B01J 19/10* (2006.01)

(56) References Cited

U.S. PATENT DOCUMENTS

| | | | |
|---|---|---|---|
| 4,242,499 | A | 12/1980 | Allcock et al. |
| 4,412,066 | A | 10/1983 | Allcock et al. |
| 8,268,959 | B2 | 9/2012 | Golding et al. |
| 9,556,314 | B2 | 1/2017 | Golding et al. |
| 2015/0141540 | A1 | 5/2015 | Golding et al. |

FOREIGN PATENT DOCUMENTS

| | | |
|---|---|---|
| WO | 2006032882 | 3/2006 |
| WO | 2013190260 | 12/2013 |

OTHER PUBLICATIONS

Ahmad, S. R. et al., "Studies into Laser Ignition of Confined Pyrotechnics," Propellants Explos, Pyrotech, 2008, pp. 396-402, vol. 33, Wiley-VCH Verlag GmbH & Co. KGaA, Weinheim, Germany.

International Patent Application No. PCT/GB2013/000275, International Search Report and Written Opinion mailed Apr. 14, 2014, 11 pages.

International Patent Application No. PCT/GB2013/000275, International Preliminary Report on Patentability mailed Dec. 31, 2014, 7 pages.

Bala, Kason, et al., "Non-Isocyanate Curable, Energetic (Azido) Polyphosphazenes," 41$^{st}$ International Conference of Fraunhofer ICT, Karlsruhe, Germany, Jun. 29-Jul. 2, 2010, 12 pages.

Finar, I. L., "Organic Chemistry, vol. 1, Fifth Edition," 1967, pp. 830-861, Longmans, Green and Co. Ltd., London.

Canadian Patent Application No. 2,877,063, Office Action mailed May 24, 2016, 3 pages.

International Patent Application No. PCT/GB2013/000276, Partial International Search Report mailed Apr. 14, 2014, 6 pages.

International Patent Application No. PCT/GB2013/000276, International Search Report mailed Jun. 17, 2014, 6 pages.

International Patent Application No. PCT/GB2013/000276, International Preliminary Report on Patentability mailed Dec. 31, 2014, 11 pages.

U.S. Appl. No. 14/408,160, "Non-Final Office Action", Mar. 7, 2016, 8 pages.

U.S. Appl. No. 14/408,160, "Restriction Requirement", Dec. 14, 2015, 8 pages.

U.S. Appl. No. 14/408,160, Ex Parte Quayle Action mailed Sep. 14, 2016, 4 pages.

U.S. Appl. No. 14/408,160, Notice of Allowance mailed Oct. 28, 2016, 7 pages.

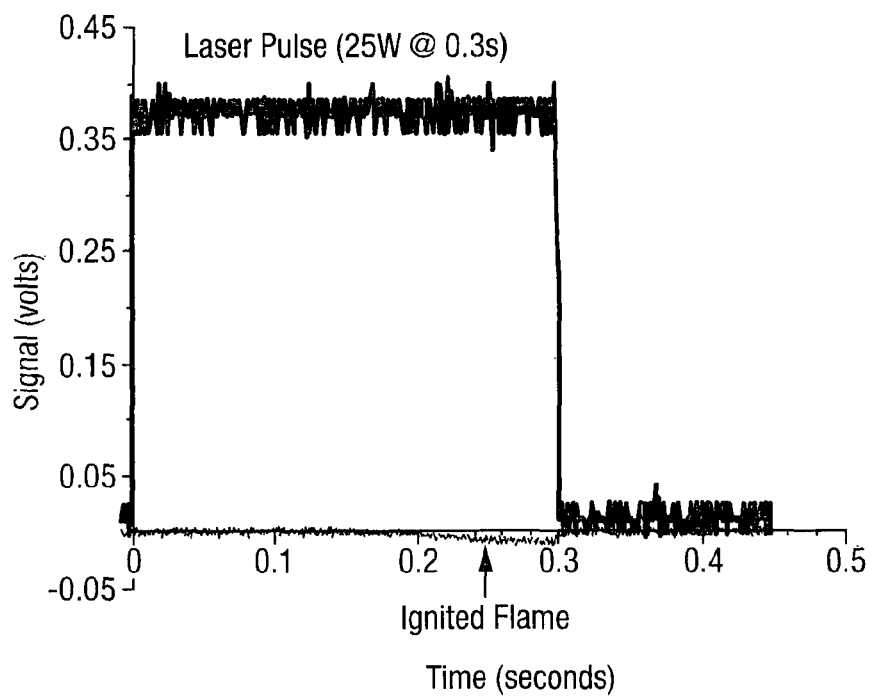
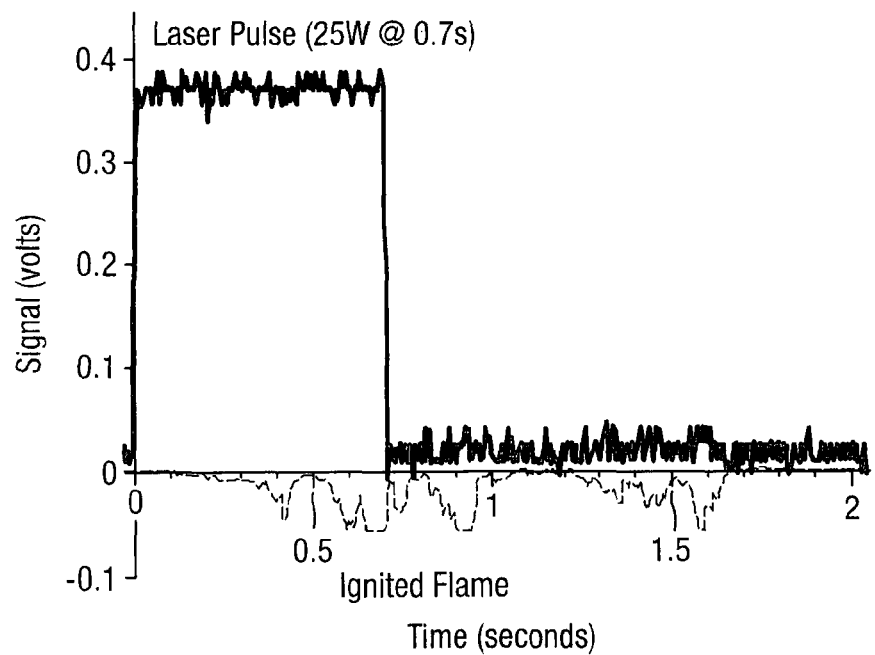

POLYPHOSPHAZENES

CROSS REFERENCE TO RELATED APPLICATIONS

This application is the U.S. national phase of International Application No. PCT/GB2013/000275 filed on Jun. 20, 2013, and published in English on Dec. 27, 2013 as International Publication No. WO 2013/190259 A2, which application claims priority to Great Britain Patent Application No. 1210980.7 filed on Jun. 21, 2012, the contents of both of which are incorporated herein by reference.

FIELD OF THE INVENTION

This invention relates to a series of energetic binders. In particular, though not exclusively, the invention relates to a series of energetic binders based on an inorganic polyphosphazene backbone. The invention also relates to the synthesis of these energetic binders, inert precursors and curing the energetic binders.

BACKGROUND TO THE INVENTION

Polymeric organic materials are widely used in all types of energetic formulations, primarily as either fuels or combustible binders. During the formulation of plastic bonded explosives, the hazard characteristics of all but the most insensitive of high explosives can be greatly improved by the addition of a suitable binder. However, whilst the addition of such a binder desensitises the explosive, if the binder is inert and, has a lower density than the filler, it inevitably detracts from the performance. The tendency when formulating explosives is therefore to maximise solids loading in order to enhance performance. In contrast, larger quantities of binder are most beneficial in optimising safety. One way of improving these conflicting requirements is to use an energetic binder.

Energetic binders can still be effective in desensitising the explosive but are also able to contribute to the overall energy of the system. The consequence of this is that they can be used in somewhat larger proportions than an inert binder, whilst retaining, or even increasing, the overall energy of the system. Given that energetic polymers may be intrinsically less sensitive, enhanced quantities of these materials may benefit charge safety by two separate mechanisms: (1) through the attainment of reduced solids loading and (2) because of the intrinsic insensitively of the material being added. Thus, as the binder loading is increased, a non-detonable energetic binder is effectively replacing a proportion of the detonable crystalline filler. The term 'energetic polymer' is normally used to describe macro molecules which contain energetic functionalities such as nitrato, nitro or azido groups.

The difficulty with energetic binders is to obtain materials which combine high energy-density with peak physical properties and ignition properties. Existing examples of energetic binders comprise glycidyl azide polymer (GAP), poly (3-methyl-3-nitratomethyl oxetane) (polyNIMMO) and polyglycidyl nitrate (polyGLYN).

The application of laser ignition to energetic materials potentially offers a number of advantages, including circumvention of electrostatic sensitivity issues and avoidance of the need to use high sensitivity (e.g. primary explosive) ingredients. Although high power UV or IR lasers can be effective at directly igniting energetic materials, such lasers tend to be unattractive for application to weapon systems due to their relatively high cost, large size and energy requirements. Near-IR (NIR) diode lasers represent a practical solution for this type of application. Thus small NIR diode lasers operating at modest power levels are both cheap and readily available.

However, organic energetic materials, including energetic binders, tend to show little absorption in this wave band and therefore respond poorly to the radiation from such lasers. This problem has been addressed through the addition of Carbon Black (CB) to the energetic material to enhance its optical absorption. But such addition is inconvenient and can increase processing costs, reduce the energy density available from the formulation and potentially modify its combustion characteristics in an adverse fashion. Also the consequences of CB addition can be difficult to predict, because they are dependent upon various factors including the relative physical characteristics of the CB and the energetic material.

It is an object of the invention to provide polyphosphazenes which overcome or mitigate at least one of the above problems and/or another problem associated with the prior art.

STATEMENTS OF THE INVENTION

From a first aspect, the invention resides in an optically sensitised binder which is an energetic polyphosphazene tailored at the molecular level to achieve enhanced absorption of electromagnetic radiation by having attached thereto a chromophore to absorb light and therefore ignite the binder in use.

The binder may be a substituted poly(phosphazene) compound comprising an energetic group and a chromophore group.

In an embodiment, the binder is a compound comprising a combination of units having one or more of the structures (i) to (iii),

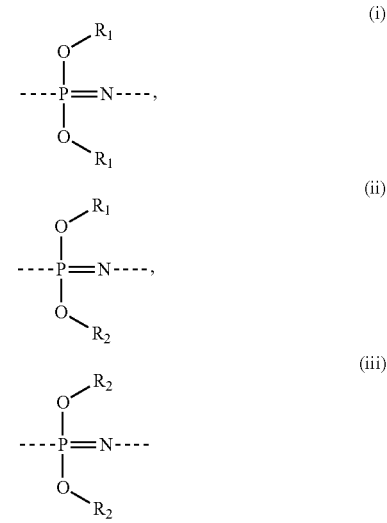

wherein: the combination comprises $R_1$ and $R_2$;
each $R_1$ is independently a side chain containing a chromophore; and
each $R_2$ is independently an energetic side chain.
Each $R_1$ and each $R_2$ is selected independently. Thus, for example, a compound may comprise a mixture of $R_1$ structures and/or a mixture of $R_2$ structures, such mixtures typically being random. However, at least half of, or even substantially all of, $R_1$ and/or $R_2$ may, in an embodiment, be identical. Therefore, where reference is made herein to "at least one $R_1$," this also embraces, but is not limited to, "at least half of $R_1$" or "each $R_1$". Similarly, where reference is made herein to "at least one $R_2$," this also embraces, but is not limited to, "at least half of $R_2$" or "each $R_2$".

In an embodiment, at least one $R_1$ or chromophore group and/or at least one $R_2$ or energetic group comprise an optionally substituted alkyl- or alkyl ether-based bridging group. In an embodiment the bridging group has 1 to 10, preferably 1 to 7 carbon atoms.

In an embodiment at least one $R_2$ or energetic group contains nitro, nitramine, nitrate ester, azide, an ammonium compound moiety with energetic counter-ion, or combinations thereof.

The ammonium compound moiety to may suitably be primary (nitrogen atom joined to the side chain and three hydrogen atoms), secondary (nitrogen atom joined to the side chain, two hydrogen atoms and an optionally substituted alkyl substituent), tertiary (nitrogen atom joined to the side chain, one hydrogen atom and two an optionally substituted alkyl substituents) or quaternary (nitrogen atom joined the side chain and three optionally substituted alkyl substituents).

In an embodiment the energetic counter ion may comprise nitrogen and/or oxygen atoms. In an embodiment, the energetic counter ion may comprise a greater number of nitrogen and/or oxygen atoms than carbon atoms.

In an embodiment at least one $R_2$ comprises one or more of:
$C_{1-18}(alkyl)CH(ONO_2)CH_2(ONO_2)$; $C_{1-18}(alkyl)CH(N_3)CH_2(N_3)$; $C_{1-18}(alkyl)CH_2(N_3)$;
$C_{1-19}(alkyl)CH_2(ONO_2)$; and an alkyl or alkyl ether based ammonium compound side chain with an energetic counter ion; or combinations thereof. In an embodiment at least one $R_2$ comprises one or more of:
$C_{1-8}(alkyl)CH(ONO_2)CH_2(ONO_2)$; $C_{1-8}(alkyl)CH(N_3)CH_2(N_3)$; $C_{1-8}(alkyl)CH_2(N_3)$
$C_{1-9}(alkyl)CH_2(ONO_2)$; and a $C_{1-9}$ alkyl or alkyl ether based ammonium compound side chain with an energetic counter ion, preferably selected from dinitramide, nitrate, tri- or tetrazolonates, picrates, or hydrazino-nitroethenates; or combinations thereof.

In an embodiment at least one $R_2$ comprises —$(CH_2)_4CH(ONO_2)CH_2(ONO_2)$; —$CH_2CH(ONO_2)CH_2(ONO_2)$; a $C_{1-5}$ (or $C_{1-3}$) alkyl or alkyl ether based ammonium compound side chain with an energetic counter ion preferably selected from dinitramide, nitrate, tri- or tetrazolonates, picrates, or hydrazino-nitroethenates; or combinations thereof.

In an embodiment, at least one $R_2$ or energetic group is an oxygen-containing side chain, preferably a side chain containing an ($ONO_2$) moiety. Such labile side chains work synergistically with the chromophore to facilitate combustion.

A chromophore is defined by IUPAC as the part (atom or group of atoms) of a molecular entity in which the electronic transition responsible for a given spectral band is approximately localized. The term arose in the dyestuff industry, referring originally to the groupings in the molecule that are responsible for a dye's colour, i.e. the selective absorption of radiation. In the context of the present invention, the term "chromophore" thus refers to atoms or groups of atoms which enhance the absorption of electromagnetic radiation.

Suitably, the chromophore enhances the absorption of electromagnetic radiation by the compound/binder, compared to compound/binder without the chromophore. The term "light" is used herein synonymously with electromagnetic radiation.

In an embodiment the chromophore absorbs, or is suitable for enhancing the absorption of, radiation having a wavelength in the range of from 200 nm to 2000 nm, preferably in the range of from 400 to 1200 nm, more preferably in the range of from 600 to 1000 nm, especially in the range of from 700 to 900 nm, in particular about 800 nm. As is known in the art; the absorption of chromophore compounds can be tailored, for example, by adjusting their degree of conjugation.

Advantageously, the chromophore may be selected and introduced in an amount sufficient to allow the compound/binder to be more readily ignited or combusted by light, e.g. laser generated light or flash tubes.

In an embodiment, the chromophore is selected and introduced to provide a binder suitable for irradiation supported combustion, i.e. combustion that occurs only upon irradiation. In an embodiment, the chromophore is selected and introduced to provide a binder suitable for ignition and self-sustaining combustion.

In one embodiment the chromophore is selected and incorporated to provide a compound/binder which is ignitable by a diode laser with a power of 44.5 W at 801 nm wavelength, a pulse duration of approximately 0.3 s, with the laser beam being focussed to produce a nominal beam spot size of 0.3 mm diameter on a sample surface.

Any suitable organic chromophore or dye may be attached to the energetic polyphosphazene/binder. In an embodiment, the chromophore comprises a conjugated system. In an embodiment the chromophore is attached by nucleophilic substitution. In an embodiment the chromophore is attached via an alkoxy bridging group, suitably an aminoalkoxy bridging group, e.g. an aminopropanoxy bridging group. In an embodiment the chromophore is attached as a counter ion of an ammonium compound side chain. The ammonium compound side chain may suitably be alkoxy based.

Examples of known dyes which may be attached to phosphazene units are provided in I. L. Finar, 'Organic Chemistry', Volume 1, Fifth Edition, 1967, Longmans, Green and Co. Ltd., London, pages 830-861, which is incorporated herein by reference. In one embodiment the chromophore is selected from, azo-dyes, diphenylmethane dyes, triphenylmethane dyes, xanthen dyes, diphenylamine (quinone-imine) dyes), heterocyclic dyes, vat dyes, anthraquinod dyes, sulphur dyes, and phthalocyanine dyes, e.g. as described in Finar.

In one embodiment the chromophore is an anthraquinod dye. In one embodiment the chromophore is a N-(1'-hydroxyanthracene-9',10'-dione-4'-yl)-3-aminopropan-1-oxy side chain:

In an embodiment, the chromophore may be an energetic counter-ion, preferably conjugated. Suitably such a, counter-ion may be attached to the binder via an ammonium compound cation. In an embodiment the energetic counter ion comprises both nitrogen and oxygen atoms and/or contains a greater number of nitrogen and/or oxygen atoms than carbon atoms. In one embodiment the energetic counter-ion may be a tri- or tetrazolonate, in particular an oxo tri- or tetrazolonate. In one embodiment the chromophore is not an energetic counter-ion. In one embodiment the chromophore is not a tri- or tetrazolonate.

In an embodiment at least 20% or even at least 50% of units in the compound are units having one or more of the structures (i) to (iii). In one embodiment the compound consists, or consists substantially of such units.

In an embodiment the compound comprises one or more further units. In an embodiment the compound further comprises one or more units having one or more of the structures (iv) to (vi)

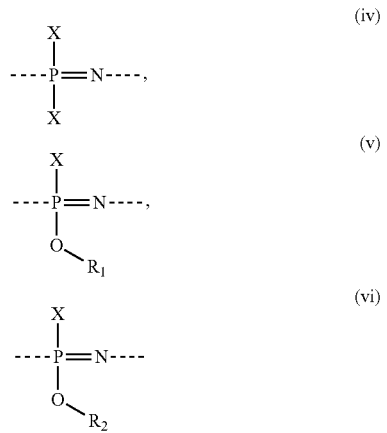

wherein $R_1$ and $R_2$ are as above; and each X is a pendant group residual from synthesis of the compound. In an embodiment each X is independently selected from $C_{1-20}$ (or $C_{1-10}$ or $C_{1-5}$) fluoroalkoxy or fluoroalkoxy ether; $C_{1-20}$ (or $C_{1-10}$ or $C_{1-5}$) aminoalkoxy and; $C_{1-20}$ (or $C_{1-10}$ or $C_{1-5}$) protected aminoalkoxy.

In an embodiment, at least one X, at least half of X, or each X, comprises —O(CH$_2$)$_3$NH$_2$; —O(CH$_2$)$_3$NHC(O)NH(CH$_2$)$_5$CH$_3$; —OCH$_2$CF$_3$ or combinations thereof.

In an embodiment at least 20% or even at least 50% of units in the compound are units having one or more of the structures (i) to (vi). In one embodiment the compound consists, or consists substantially of such units.

In an embodiment the compound comprises one or more further units.

In an embodiment the compound is or has the structure of Poly PZ-5 or Poly PZ-6.

In an embodiment the compound/binder comprises in the range of from 0.1% to 20%, preferably in the range of from 0.5% to 15%, more preferably in the range of from 0.1% to 5%, or even in the range of from 2% to 4% of chromophore groups or side chains containing $R_1$. In an embodiment the compound comprises at least 50%, preferably at least 65%, more preferably at least 75% of energetic groups or side chains containing $R_2$.

In an embodiment the polymer comprises n units, with 3<n<3000. In an embodiment 100<n<3000. In an embodiment the polymer has a number average molecular weight ($M_n$) in the range of from 1,000 to 150,000, for example in the range of from 5,000 to 50,000 even in the range of from 10,000 to 30,000 g mol$^{-1}$.

From a third aspect, the invention resides in a method for the synthesis of an energetic poly(phosphazene) compound comprising a chromophore, such as for example any of the compounds defined or described herein, the method comprising providing a substitutable poly(phosphazene) backbone; attaching a pendant chromophore group —O—R$_1$, or a precursor thereof, to the backbone via nucleophilic substitution with an alkoxide; attaching a pendant energetic group —O—R$_2$, or a precursor thereof, to the backbone via nucleophilic substitution with an alkoxide; and converting at least part of any precursor into the relevant pendant group.

In an embodiment the method comprises the sequential steps of: attaching nitratable precursor groups of —O—R$_2$ to the backbone; attaching aminoalkoxy groups to the backbone; nitrating to convert the precursor groups to nitratoalkoxy groups (forming —O—R$_2$) and to convert the aminoalkoxy groups into ammonium nitrate alkoxy groups; reconverting the ammonium nitrate alkoxy groups to aminoalkoxy groups and reacting the aminoalkoxy groups with a chromophore to form —O—R$_1$.

In an embodiment, a first subset of the aminoalkoxy groups is reacted with the chromophore to form —O—R$_1$ and a remaining subset of the aminoalkoxy groups is capped off with a protecting group. In an embodiment the aminoalkoxy groups are capped off by a reaction with an isocyanatoalkane.

In an embodiment, the nitratable precursor comprises a dioxolan. In one embodiment the nitratable precursor comprises a (2',2'-dimethyl-1',3'-dioxolan-4'yl)-methan-1-oxy group.

From a fourth aspect, the invention resides in the use any of the compounds defined or described herein as energetic binders/co-binders/ingredients for explosives, pyrotechnic compositions or propellant compositions.

From a fifth aspect, the invention resides in a method of igniting or combusting any of the binders described herein, the method comprising irradiating the binder with an effective amount of electromagnetic radiation.

In an embodiment, the binder is irradiated with a laser to effect combustion supported by the irradiation. In an embodiment, the composition is irradiated to effect self-sustaining combustion.

Throughout the description and claims of this specification, the words "comprise" and "contain" and variations of the words, for example "comprising" and "comprises", mean "including but not limited to", and do not exclude other moieties, additives, components, integers or steps. Moreover the singular encompasses the plural unless the context otherwise requires: in particular, where the indefinite article is used, the specification, is to be understood as contemplating plurality as well as singularity, unless the context requires otherwise.

Preferred features of each aspect of the invention may be as described in connection with any of the other aspects. Other features of the invention will become apparent from the following examples. Generally speaking the invention extends to any novel one, or any novel combination, of the features disclosed in this specification (including any accompanying claims and drawings). Thus features, integers, characteristics, compounds, chemical moieties or groups described in conjunction with a particular aspect, embodiment or example of the invention are to be understood to be applicable to any other aspect, embodiment or example described herein unless incompatible therewith. Moreover unless stated otherwise, any feature disclosed herein may be replaced by an alternative feature serving the same or a similar purpose.

Where upper and lower limits are quoted for a property then a range of values defined by a combination of any of the upper limits with any of the lower limits may also be implied.

In this specification, references to parameters are—unless stated otherwise—to properties measured under ambient conditions, i.e. at atmospheric pressure and at a temperature of from 16 to 22 or 25° C., or from 18 to 22 or 25° C., for example about 20° C.

The chemical names provided below do not necessarily comply rigorously with accepted chemical naming conventions. However, when taken in conjunction with the chemical formulae provided elsewhere in this submission, they should be unambiguous.

Throughout the description, the full name of the compound made and/or its structure will be given along with an abbreviated name for ease of reading. The majority of the polyphosphazene products described herein comprise random mixed substituent polyphosphazenes containing a number of chemically different side groups on a single molecular polymer chain. For brevity, where these side groups are named and it is desired to indicate the relative (nominal) proportions which are present in the molecule, these are shown in brackets after the name of the relevant substituents, in the form of a percentage. Thus, for example the mixed substituent PolyPZ-4 containing 14% of 2,2,2-trifluoroethan-1-oxy groups, 75% of 5,6-dinitratohexan-1-oxy groups and 11% of 3-aminopropan-1-oxy groups is named as:—[P-(2,2,2-trifluoroethan-1-oxy (14%)/5,6-dinitratohexan-1-oxy (75%)/3-aminopropan-1-oxy (11%)] polyphosphazene].

The various mixed substituent polyphosphazenes described herein are believed to be predominantly linear (unless cured) and to be randomly substituted by the different side chain functionalities. Unless otherwise stated the degrees of substitution given for the different side chains (within a single molecule) have been determined by means of $^1$H NMR (nuclear magnetic resonance spectroscopy) using a Bruker DPX-250 spectrometer. Chemical shifts are quoted in parts per million, with reference to tetramethylsilane (TMS) for $^1$H and $^{13}$C spectra and to an internal instrument reference (nominally $CFCl_3$) for $^{19}$F spectra. All such figures are nominal, being limited by the degree of accuracy afforded by this technique.

The present invention will now be further described with reference to the following non-limiting examples and the accompanying illustrative drawings, of which:

Figure 1:
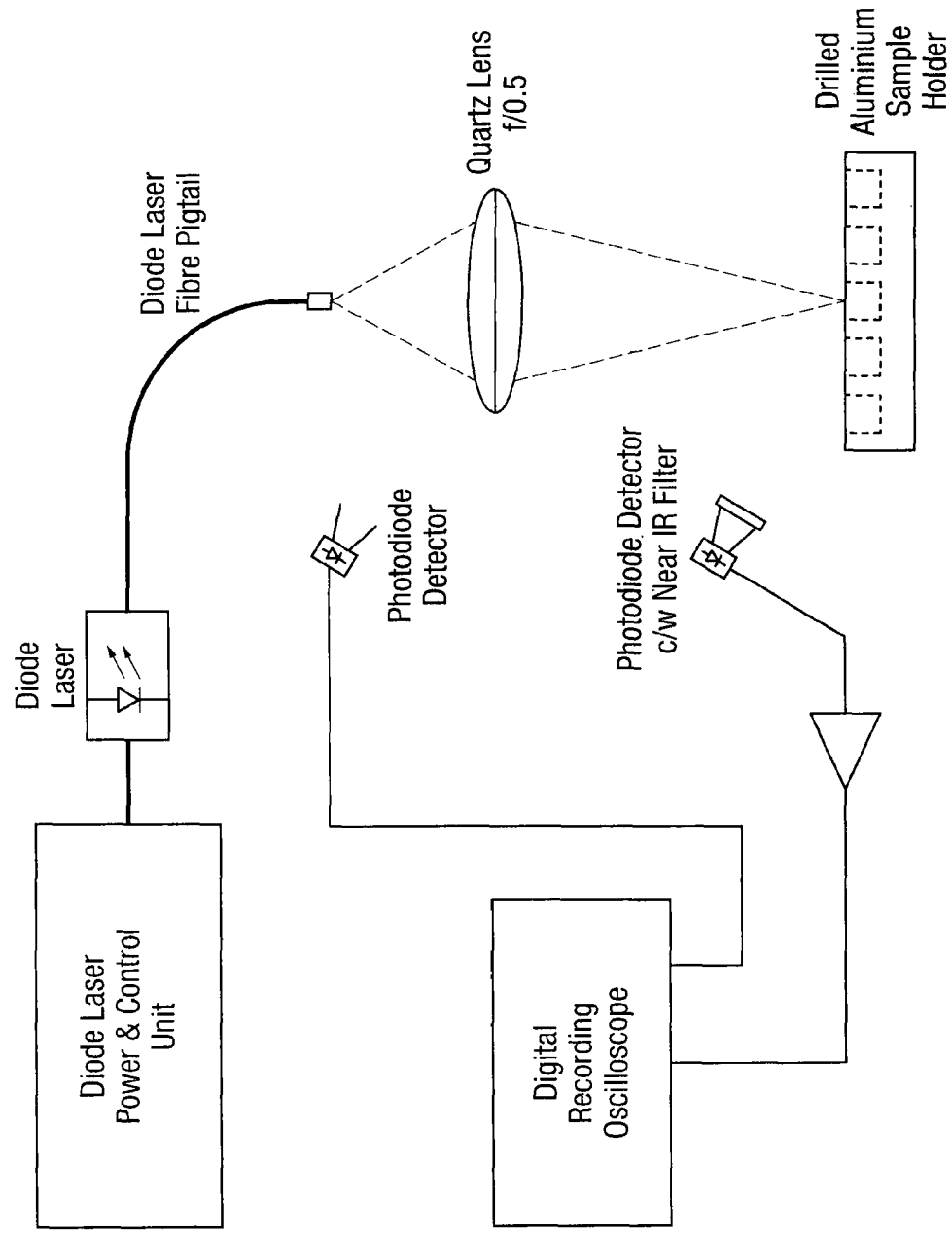
FIG. 1 shows a schematic of a laser ignition apparatus used to test embodiments of the invention.

For ease of reference, a list of the names of the polyphosphazenes referred to in this application is provided at the end of the description, along with their chemical structures.

DETAILED DESCRIPTION/EXAMPLES

Organic energetic materials have tended to show little absorption and therefore respond poorly to the radiation from lasers. This problem has previously been addressed through the addition of Carbon Black to the energetic material to enhance its optical absorption. However, such addition is inconvenient and can increase processing costs, reduce the energy density available from the formulation and potentially modify its combustion characteristics in an adverse fashion. Also the consequences of carbon black addition can be difficult to predict, because they are dependent upon various factors including the relative physical characteristics of the carbon black and the energetic material.

In order to overcome this problem, a chromophore can be attached to the polyphosphazene to absorb light and therefore ignite the binder.

Aspects of the invention relate to optically sensitised binders which are energetic polyphosphazenes tailored at the molecular level to achieve enhanced absorption of electromagnetic radiation.

The inventors have made energetic polyphosphazenes which can be ignited from sources such as laser generated light or flash tubes without the need to add other optical sensitisers. The application of laser ignition to energetic materials potentially offers a number of advantages, including circumvention of electrostatic sensitivity issues and avoidance of the need to use high sensitivity (e.g. primary explosive) ingredients. Although high power UV or IR lasers can be effective at directly igniting energetic materials, such lasers tend to be unattractive due to their relatively high cost, large size and energy requirements. It is possible to use any wavelength of light to trigger the ignition whether it be from a flash tube or a laser. Smaller lasers may be required for applications where space is of a premium and near-IR (NIR) diode lasers represent a practical solution for this type of application. Thus small NIR diode lasers operating at modest power levels are both cheap and readily available.

Synthesis of the Optically Ignitable Polyphosphazenes PolyPZ-5 and PolyPZ-6

Preparation of Leucoquinizarin (LQ) from Quinizarin (Q)

Potassium carbonate (1.34 g, 9.6 mmol) was added to stirred water (20 ml) inside a 50 ml 3-necked round bottomed flask. After heating to 80° C., the solution was deaerated by bubbling nitrogen gas through it for 30 minutes (at 80° C.). Keeping the solution under positive nitrogen pressure (but without further bubbling), sodium dithionite (1.16 g, 6.7 mmol) and then 1,4-dihydroxyanthracene-9,10-dione (Quinizarin, Aldrich, 97%, 1.0 g, 4.13 mmol) were added. After 1 hour more sodium dithionite (0.67 g, 3.87 mmol) was added and the mixture was kept at 80° C. for 16 hours with vigorous stirring and a reflux condenser in place. The dark yellow suspension was filtered off under a nitrogen stream and thoroughly washed with degassed, warm (~50° C.) water (3×20 ml). The red filtrate was discarded. The wet yellow solid was dried in a dessicator over drying agent to give 2,3-dihydroquinizarin, leucoquinizarin (LQ) as a canary yellow powder. Yield: 866 mg (86%). NMR ($CDCl_3$): 1H: 3.05 (s, 4.00H, C-2 $CH_2$ and C-3 $CH_2$), 7.71-7.78 (m, 1.97H, C-6 CH and C-7 CH), 8.40-8.46 (m, 1.96H, C-5 CH and C-8 CH) and 13.56 ppm (s, 1.99H, 2×OH). $^{13}$C: 35.99 (C-2 and C-3), 107.6, 124.8, 129.5, 130.6, 155.4 and 201 ppm (carbonyl).

Preparation of Rubbery PolyPZ-5 [P-(2,2,2-trifluoroethan-1-oxy/(5,6-dinitratohexan-1-oxy/3-aminopropan-1-oxy/N-(1'-hydroxyanthracene-9',10'-dione-4'-yl)-3-aminopropan-1-oxy) polyphosphazene]

4'-yl)butan-1-oxy (75%)/3-aminopropan-1-oxy (11%)) polyphosphazene] which still contained free 3-aminopropan-1-ol and mineral oil as contaminants. (These were removed in the next step.)

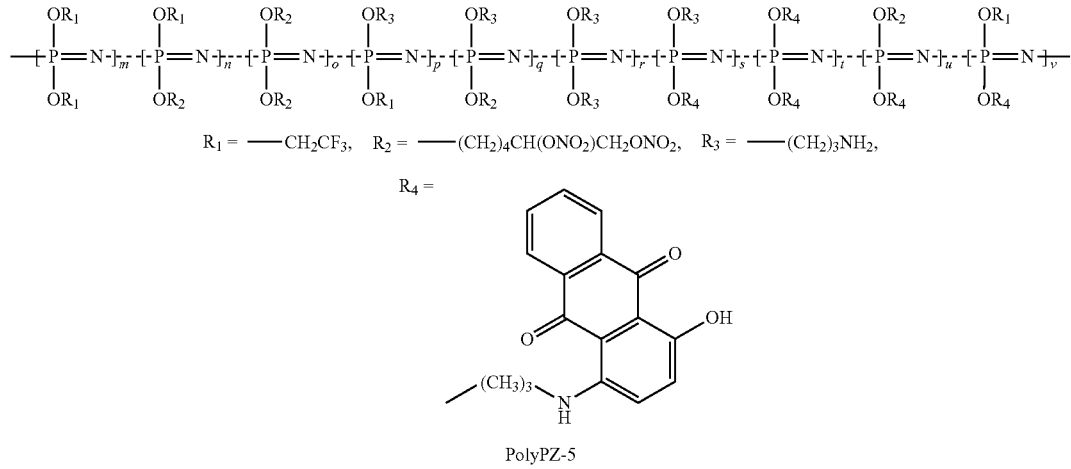

PolyPZ-5

Preparation of PolyPZ-2 (2,2,2-trifluoroethan-1-oxy (14%)/2,2-dimethyl-[1,3]-dioxolan-4-yl)butoxy (75%)/3-aminopropoxy (11%)) polyphosphazene The reaction was carried out under a nitrogen atmosphere. Sodium hydride as a 60% w/w dispersion in mineral oil (23.0 g, 0.57 mol NaH) was suspended in dry THF (700 ml) in a three-necked 3 L round bottomed flask, fitted with mechanical stirring. The mineral oil was not eliminated at this stage. A solution of 3-aminopropan-1-ol (43.2 g, 0.57 mol) in dry THF (100 ml) was added during 30 minutes via a pressure equalising funnel and the mixture was vigorously stirred at room temperature for 1.5 h, during which time hydrogen evolution took place. A solution of PolyPZ-1 [P-(2,2,2-trifluoroethan-1-oxy (25%)/4-(2',2'-dimethyl-1',3'-dioxolan-4'-yl)-butan-1-oxy (75%)) polyphosphazene, monomer unit molecular weight (MW): 346.5], (40.0 g, 0.12 mmol) in dry THF (700 ml) was added in a single portion and the mixture was refluxed for 24 h. The solvent was evaporated and the residual yellow product was mechanically stirred in water (3 L) inside a 5 L glass beaker. The resulting suspension was acidified to pH-2 (aq. HCl 18.5 wt %, ~120 ml) and CHCl$_3$ (1 L) was added. The mixture was stirred for 5 minutes to extract the product; phase separation took place overnight. The following morning the aqueous phase was siphoned off and the organic phase washed with water (3×1 L) and brine (500 ml) with mechanical stirring. It was then left to phase separate, after which the brine was siphoned off and the organic solution dried (MgSO4, 200 g), filtered and evaporated to yield crude PolyPZ-2 [P-(2,2,2-trifluoroethan-1-oxy (14%)/4-(2',2'-dimethyl-1',3'-dioxolan- Nitration of PolyPZ-2 to Yield PolyPZ-3 [P-(2,2,2-trifluoroethan-1-oxy (14%)/5,6-dinitratohexan-1-oxy (75%)/3-ammonium (nitrate) propan-1-oxy (11%)) polyphosphazene]

All of the crude PolyPZ-2 product obtained above was dissolved in acetone (100 ml) and the solution divided into three equal volumetric portions, each of which was transferred into a 1 L round bottomed flask. Each aliquot was evaporated to leave a film of polymer on the inside of the flask, which was then pre-cooled to ~0° C. inside a large ice/water bath. Then to each of the three flasks was added pre-cooled (also at ~0° C.) 95% nitric acid (150 ml) in a swift, single addition. The flasks were manually swirled in the cold bath for 10 minutes, after which time the polymer had dissolved in the acid. The content of each flask was quenched into water (1 L) inside a 3 L beaker. The suspensions were mechanically stirred to coagulate the nitrated product. The clear supernatant liquors were discarded and the swollen products rinsed with fresh water (2×250 ml) and dried in vacuo at 50° C. The three aliquots were combined, after NMR analysis, as solutions in acetone (50 ml). Precipitation into hexane (twice, 500 ml) eliminated the mineral oil. The supernatant solution was decanted and the hexane recycled by distillation. Solvent removal was effected under high vacuum at 50° C. for 1 h. This yielded PolyPZ-3 [P-(2,2,2-trifluoroethan-1-oxy (14%)/5,6-dinitratohexan-1-oxy (75%)/3-ammonium (nitrate) propan-1-oxy (11%)) polyphosphazene], yield: 41.4 g. NMR spectroscopic analysis confirmed the absence of any residual oil and indicated that the polymer had been fully nitrated.

Preparation of PolyPZ-4 [P-(2,2,2-trifluoroethan-1-oxy (14%)/5,6-dinitratohexan-1-oxy (75%)/3-aminopropan-1-oxy (11%)) polyphosphazene]

The nitrated PolyPZ-3 (41.4 g, monomer unit MW: ~445, 90 mmol) was dissolved in THF (500 ml) and the solution gravity percolated through a 10 cm diameter and 30 cm tall column of dry Amberlyst A-26 anion exchange resin (Aldrich, OH— form, 1200 ml, exchange capacity ~4 mmol/ml) which had been dried under high vacuum (~1 mmHg) at 40° C. for 2 h. The column was fitted at the bottom with a No. 3 frit filter to retain the resin beads and also with a glass tap with stopcock to control the vacuum in the next stage of the work. The resin was first wetted and compacted by flushing it with THF (500 ml). After closing the bottom tap, a second aliquot of THF (500 ml) was added to 'saturate' the packing. Then the polymer solution was added with the aid of a 25 ml pipette, to avoid disturbing the packing. The solution accumulated on the top of the saturated bed of resin, slowly diffusing into the column. (This facilitated the generation of a relatively 'sharp' eluent front.) The stopcock was then opened and the solution allowed to elute under gravity. Finally application of mild vacuum from a water pump to the bottom tap effected removal of all the residual liquid, which was collected in a large Erlenmeyer flask fitted with rubber bung and vacuum outlet. [NB: If time is available it can be beneficial to omit final application of vacuum to the column, to avoid generating channels through the packing.] The vacuum was released and the column flushed with more THF (2×250 ml), all eluates [containing PolyPZ-4 (P-(2,2,2-trifluoroethan-1-oxy (14%)/5,6-dinitratohexan-1-oxy (75%)/3-aminopropan-1-oxy (11%)) polyphosphazene)] being combined (~1.5 L) for use in the next step.

Reaction of PolyPZ-4 with LQ to Yield Rubbery PolyPZ-5 [P-(2,2,2-trifluoroethan-1-oxy (14%)/(5,6-dinitratohexan-foxy (75%)/3-amino propan-1-oxy (9%)/N-(1'-hydroxyanthracene-9',10'-dione-4'-yl)-3-aminopropan-1-oxy (2%)) polyphosphazene]

The solution containing PolyPZ-4 was transferred to a 3 L round bottomed flask fitted with a water condenser and mechanical stirring. Leucoquindarin (LQ, 15.0 g) was added with vigorous stirring. This immediately dissolved imparting a bright orange colour to the clear solution. The mixture was boiled under reflux under a nitrogen atmosphere for 48 h. (The deep purple colour characteristic of mono-alkylaminoanthracenediones developed almost immediately when heat was applied.) The solvent was then eliminated by evaporation at 50° C. The dark gummy product was re-dissolved in acetone (100 ml) and the solution twice precipitated drop-wise into $CHCl_3$ (500 ml) to remove residual quinizarin and leucoquinizarin. The second precipitation required seeding with a small amount of solid product from the first precipitation to encourage coagulation [NB: the dark $CHCl_3$ supernatant washings should be kept standing for at least 10 days, to allow further product precipitation as this improves the yield compared to that initially obtained (below)]. The purple supernatant solution was decanted and the product re-dissolved in acetone (20 ml). Removal of this solvent by evaporation under high vacuum at 50° C. yielded PolyPZ-5 [P-(2,2,2-trifluoroethan-1-oxy (14%)/(5,6-dinitratohexan-1oxy (75%)/3-amino propan-1-oxy (9%)/N-(1'-hydroxyanthracene-9',10'-dione-4'-yl)-3-aminopropan-1-oxy (2%)) polyphosphazene] as a deep purple rubbery solid (yield: 17.2 g), but simultaneously promoted some cross-linking yielding 1.2 g of a DMSO insoluble purple black solid. It was subsequently established (after re-dissolving the product in acetone and filtering off the insoluble product) that solvent evaporation performed at ambient temperature did not cause the generation of insoluble matter; consequently this is the preferred procedure. The final yield of soluble PolyPZ-5 was only 16.0 g (25.0 g expected).

Preparation of Brittle-solid PolyPZ-5, [P-(2,2,2-trifluoroethan-1-oxy (8%)/(5,6-dinitratohexan-1-oxy (55%)/3-amino propan-1-oxy (30%)/N-(1'-hydroxyanthracene-9',10'-dione-4'-yl)-3-aminopropan-1-oxy (7%)) polyphosphazene]

PolyPZ-3 [P-(2,2,2-trifluoroethan-1-oxy (8%)/5,6-dinitratohexan-1-oxy (55%)/3-ammonium (nitrate) propan-1-oxy (37%)) polyphosphazene] (300 mg, unit monomer MW: 407.5, 0.74 mmol) was dissolved in anhydrous THF (5 ml). The clear yellow solution was stirred and then filtered through a pad of dry Amberlyst A26 resin (OH— form, exchange capacity 4.4 meq ml-1, 10 ml, measured in a small graduated cylinder). To the filtrate, containing the neutralised polymer (PolyPZ-4), was added 2,3-dihydro-1,4-dihydroxyanthracene-9,10-dione, leucoquinizarin, LQ (132 mg, 0.55 mmol, 2 equivalents/aminopropoxy unit). The clear orange solution was boiled under reflux under a nitrogen blanket for 48 hours, after which time the THF was eliminated by evaporation. The dark purple residue was dissolved in acetone (2 ml) and re-precipitated drop-wise into chloroform (50 ml, twice). After decanting the supernatant liquor from the second precipitation, the last traces of chloroform were eliminated by evaporation under high vacuum at ambient temperature. The PolyPZ-5 product [P-(2,2,2-trifluoroethan-1-oxy (8%)/(5,6-dinitratohexan-1-oxy (55%)/3-amino propan-1-oxy (30%)/N-(1'-hydroxyanthracene-9',10'-dione-4'-yl)-3-aminopropan-1-oxy (7%)) polyphosphazene] was obtained as a black, hard, brittle solid (177 mg) which softened to a rubbery consistency at ~60° C. The material dissolved readily in acetone and THF, giving deep purple solutions. NMR (acetone-$d_6$): 1H: 1.29-1.88 (br m, 9.8H, 3×$CH_2$ of energetic C6 substituent), 2.17-3.80 (br m, 3.37H, 3×$CH_2$ of functionalised and un-functionalised aminopropoxy units), 4.06-5.02 (br m, 9.6H, energetic C6 substituent: $OCH_2$+$CHONO_2$+$CH_2ONO_2$, $CH_2$ trifluoroethoxy), 5.33 (br s, 0.17H, suspected CHOH arising from partial reduction of energetic C6 substituent), 5.50 (br s, 1.00H, $CHONO_2$ energetic C6 substituent) and 7.75-8.36 ppm (br m, 0.99H, indistinct collection of aromatic CH signals assigned to polymeric anthraquinoid units in slightly different environments. $^{19}$F: (no internal standard): ~76.4 ppm (trifluoroethoxy), $^{13}$C (10000 pulses): only the energetic C6 substituent carbons (minus $CHONO_2$) were observed.

Conversion of PolyPZ-5 to PolyPZ-6 [P-(2,2,2-trifluoroethan-1-oxy/(5,6-dinitratohexan-1-oxy/4,6-diaza-5-oxododecan-1-oxy/N-(1'-hydroxyanthracene-9',10'-dione-4'-yl)-3-aminopropan-1-oxy) polyphosphazene]

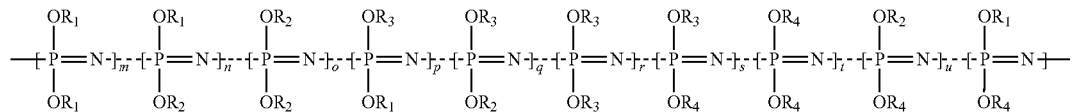

$R_1 = \text{—CH}_2\text{CF}_3$, $R_2 = \text{—(CH}_2)_4\text{CH(ONO}_2)\text{CH}_2\text{ONO}_2$, $R_3 = \text{—(CH}_2)_3\text{NHC(O)NH(CH}_2)_5\text{CH}_3$ $R_4 =$

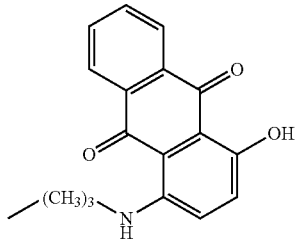

PolyPZ-6

1-Isocyanatohexane (367 μl, 322 mg, 2.54 mmol) was added to a solution of PolyPZ-5 [P-(2,2,2-trifluoroethan-1-oxy (14%)/(5,6-dinitratohexan-1oxy (75%)/3-aminopropan-1-oxy (9%)/N-(1'-hydroxyanthracene-9',10'-dione-4'-yl)-3-aminopropan-1-oxy (2%)) polyphosphazene] (1.10 g, 2.54 mmol) in dry THF (30 ml). The solution was boiled under reflux for 16 h; the solvent was then eliminated by evaporation. Drop wise re-precipitation of the product from acetone (4 ml) into hexane (50 ml) removed any unreacted isocyanate. After rinsing the product with fresh hexane (2×10 ml) and removing residual solvent under vacuum at 50° C., PolyPZ-6 [P-(2,2,2-trifluoroethan-1-oxy (14%)/(5,6-dinitratohexan-1-oxy (75%)/4,6-diaza-5-oxododecan-1-oxy (9%)/N-(1'-hydroxyanthracene-9',10'-dione-4'-yl)-3-aminopropan-1-oxy (2%)) polyphosphazene] was isolated as a dark, purple gummy solid. Yield: 560 mg. This product remained readily soluble in acetone, MEK, THF and EtOAc, even after ageing at 70° C. for 48 h (which produced no insoluble particulate matter in suspension). NMR (acetone-$d_6$): $^1$H (hexylcarboxamide visible signals only): 0.89 (br s, 3.00H, Me), 1.31 (br m, ~6.95H partially overlapping, 3×CH$_2$) and 3.81 ppm CH$_2$NHCO). As PolyPZ-6 is energetic, its decomposition under the influence of the laser decreases the total energy required from the laser to effect ignition.

Materials Data

PolyPZ-1 [P-(2,2,2-trifluoroethan-1-oxy)/4-(2',2'-dimethyl-1',3'-dioxolan-4'-yl)-butan-1-oxy) polyphosphazene] and PolyPZ-7 [P-(2,2,2-trifluoroethan-1-oxy/5,6-dinitratohexan-1-oxy) polyphosphazene] were prepared as previously described in WO2006/032882. PolyPZ-6 [P-(2,2,2-trifluoroethan-1-oxy (14%)/(5,6-dinitratohexan-1-oxy (75%)/4,6-diaza-5-oxododecan-1-oxy (9%)/N-(1'-hydroxyanthracene-9',10'-dione-4'-yl)-3-aminopropan-1-oxy (2%) polyphosphazene] was prepared as detailed above and stored in acetone solution. The molecular weight (Mn) of the former polymer was approximately 20,000 g mol$^{-1}$ (polystyrene equivalent). Given that PolyPZ-6 was derived from the same precursor polymer as PolyPZ-7 and that substitution reactions have been found to have only a minor impact on the molecular weight distribution of these polymers, the former material is believed to possess a broadly similar molecular weight to the latter. The HNS IV (EURENCO) had a mean particle size of 2.33 μm.

Sample Preparation

PolyPZ-6 mixtures: Two stock solutions were prepared in acetone, one of PolyPZ-7 at 210 μg/μl and the other of PolyPZ-6 at 42 μg/μl. The former solution was then used to dilute the latter (in the optical sense) in order to produce a range of samples possessing different concentrations of the two polymers ranging from 1 wt % PolyPZ-6 (Q1) to 95 wt % PolyPZ-6 (Q95). After mixing each sample the acetone was removed under reduced pressure (60° C., water pump), then the sample was degassed for a period of 3-4 hours using a vacuum pump at ambient temperature.

HNS IV/PolyPZ-6: Approximately 90 wt % HNS (Hexanitrostilbene) (0.45 g) and 10 wt % PolyPZ-6 (0.05 g) were mixed until uniform in solid phase using a glass stirring rod. Mixing was facilitated by the addition of approximately 0.5 ml acetone, which was subsequently allowed to evaporate under the airflow in a fume cupboard. Further samples were prepared using the same method, but with different PolyPZ-6 contents, up to 30 wt %.

The laser ignition apparatus is shown schematically in FIG. 1. The diode laser (Laser Electronics, Germany) equipped with a LDC1000 controller, provided a maximum output power of 44.5 W at 801 nm wavelength. Pulse duration was varied in the range 10-500 ms, with firing times in excess of 500 ms achieved using continuous wave (CW) mode. The laser beam was focused using two plano-convex quartz lenses having an effective aperture of 50 mm and a combined focal length of 25 mm (f/0.5). This produced a nominal beam spot size of 0.3 mm diameter on the sample surface (0.8 mm diameter for HNS/PolyPZ-6 formulations). The test samples were held semi-confined within holes drilled into an aluminium block (~3 mm deep, diameter ~3 mm). The ignition process was recorded using a photodiode detector (OSRAM Silicone PIN Photodiode: BPX 65, rise time ~12 ns) in the vicinity of the sample holder. A NIR filter placed in front of the detector blocked out any reflected or scattered laser radiation. A fast amplifier (Oriel 70710) having a bandwidth of 80 KHz and a gain of $10^6$ volts/amp was used to enhance the photodiode signal arising from sample ignition. The temporal history of the ignition process was recorded using a digitizing oscilloscope (DSO5054A, Agilent Technologies, USA) having a bandwidth of 500 MHz. When determining ignition delay time, in order to avoid difficulties in identifying the precise moment of ignition—which is not always well defined—ignition of the sample was assumed when its optical output reached 10% of the maximum flame intensity. Unexpectedly, the ignition efficiency of the binder mixed with HNS is much greater than that of the binder alone. Such synergy will facilitate a reduction in the quantity of "deadweight", i.e. energetically inert, chromophore which has to be added to a system to effect ignition.

Since the PolyPZ-6 formulations undergo laser supported ignition at certain power levels, but sustainable laser ignition at higher power levels, there is a potential here to design a solid propellant which possesses (laser) switchable burn rates which is widely desired.

Given that low laser energies cause PolyPZ-6 to burn in an unsustainable fashion leaving unconsumed explosive filler, whilst higher energies achieve sustainable burn of the binder and filler together, there is a potential here for benign safing of an energetic formulation. (i.e. high energy laser ignites the formulation normally to give a complete (high energy) burn, whilst low energy laser causes combustion of just the binder (with minimal energy release) leaving the filler largely unconsumed.

Incorporation of PolyPZ-6 into a formulation facilitates its laser ignitability, without significant modification of the thermal conductivity of the system. This is a considerable advantage over the currently used compositions with carbon black. This should make it possible to control burn rate independently of the percentage of optical sensitizer added.

Figure 2:
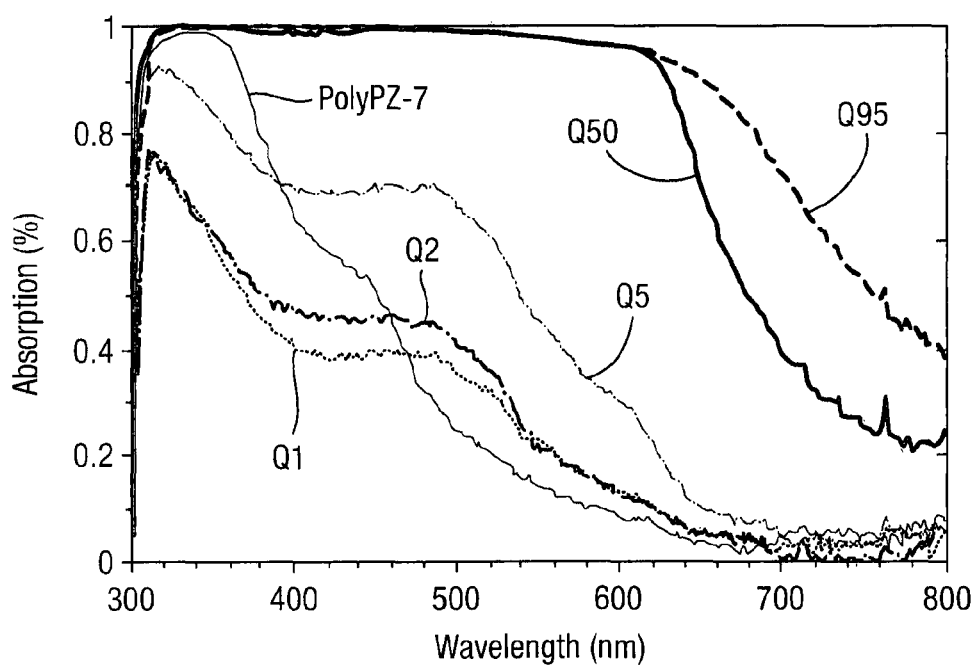
FIG. 2 shows absorption spectra for compound PolyPZ-7, and its blends with compound PolyPZ-6 (1-95 wt %)

Previous examination of the laser ignition of PolyPZ-7 [P-(2,2,2-trifluoroethan-1-oxy (30%)/5,6-dinitratohexan-1-oxy (70%)) polyphosphazene] has shown that an optical sensitizer is necessary to achieve effective deflagration of this product. The current work has confirmed this observation as even the maximum available laser power of 44.5 W failed to ignite this material. Such results are attributed to the poor optical absorption of this polymer in the NIR (FIG. 2). The structure of PolyPZ-7 has been modified to incorporate a quinizarin based chromophore. PolyPZ-6 is a random mixed substituent polymer based upon the structure of PolyPZ-7, but with approximately 2% of the side chain functionalities replaced by quinizarin moieties. The introduction of these side groups has a dramatic effect upon the absorption spectrum of the material. Thus, whilst the precursor PolyPZ-7 displays a translucent reddish-brown colouration, PolyPZ-6 is a very deep, virtually opaque purple.

Figure 3:
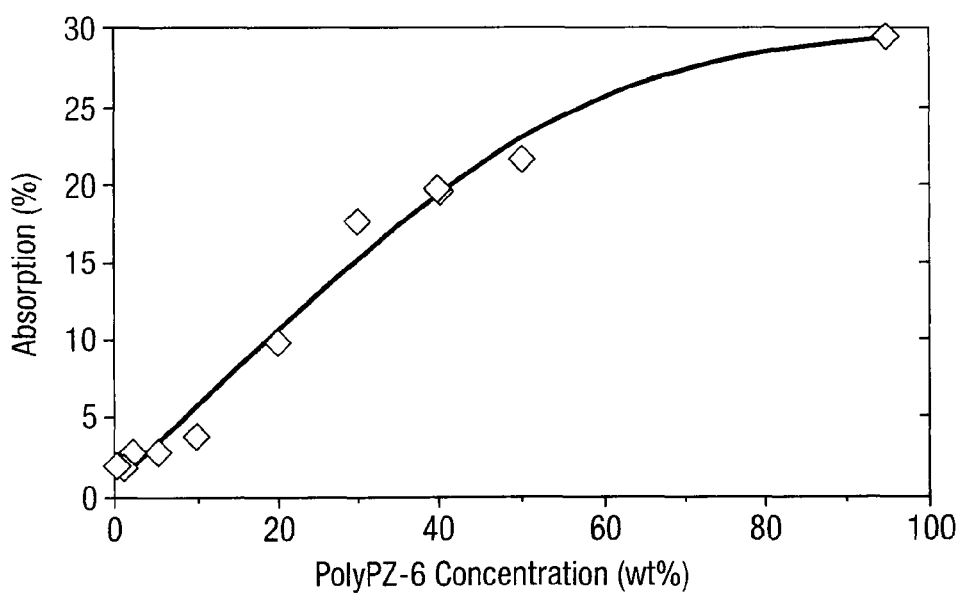
FIG. 3 shows absorption at 801 nm of PolyPZ-6 (1-100 wt %) blended with PolyPZ-7.

A number of blends of PolyPZ-6 with a PolyPZ-7 as a diluent were prepared. This latter material was ideal for reducing the optical density of PolyPZ-6 because its chemical structure was closely related to that of PolyPZ-6, but it exhibited negligible absorption within the region of interest. Mixtures were defined by their PolyPZ-6 content; thus a blend containing 1 wt % of PolyPZ-6 is designated Q1, that containing 50 wt % as Q50 and pure PolyPZ-6 as Q100 (etc). The resultant spectra recorded across a range of concentrations of PolyPZ-6 are presented in FIG. 2. The spectra show that PolyPZ-6 has a broad absorption band in the vicinity of 800 nm which becomes particularly noticeable at higher concentrations, although its absorption across the visible region is considerably stronger. The absorption of different blends of PolyPZ-6 (1-100%) with PolyPZ-7 was also measured at the specific laser wavelength of 801 nm (FIG. 3). Although NIR absorption is the focus for the current work, the strong absorption of PolyPZ-6 in the visible waveband suggests that this material should respond readily to stimulation in this region (e.g. by a flash tube).

Laser Ignition Tests

Laser ignition tests on pure PolyPZ-6 (Q100) were carried out using the apparatus depicted in FIG. 1. Key parameters explored were the laser powers and pulse durations required to achieve self-sustaining combustion. Flames arising from sample ignitions were detected optically and recorded by an oscilloscope. Selected oscilloscope traces depicting the temporal histories of ignition events for PolyPZ-6 at two different laser power levels and pulse durations are presented in FIG. 4.

Figure 4A:
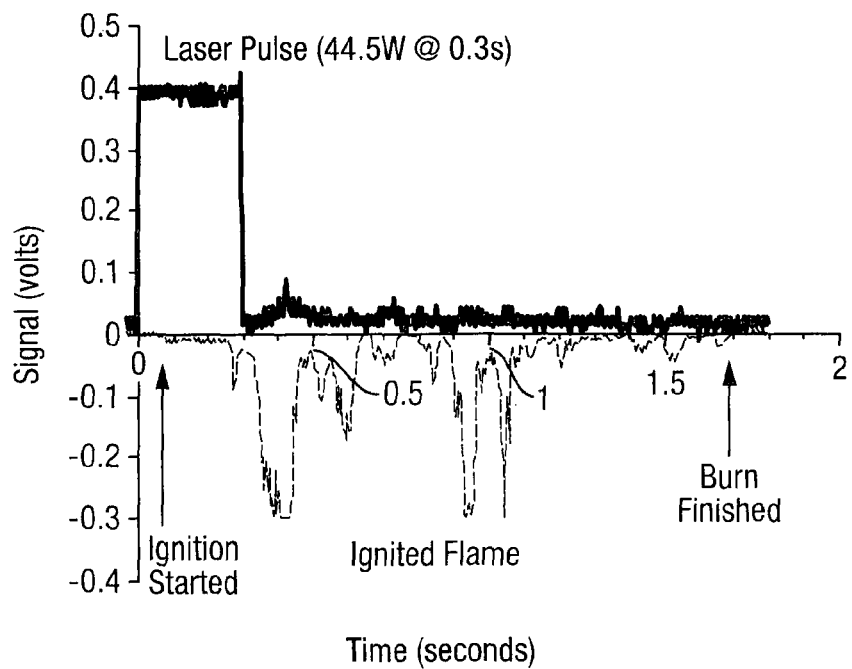
FIG. 4 shows oscilloscope traces of the ignition events for PolyPZ-6 using two different laser power levels and two different pulse durations.
Figure 4B:
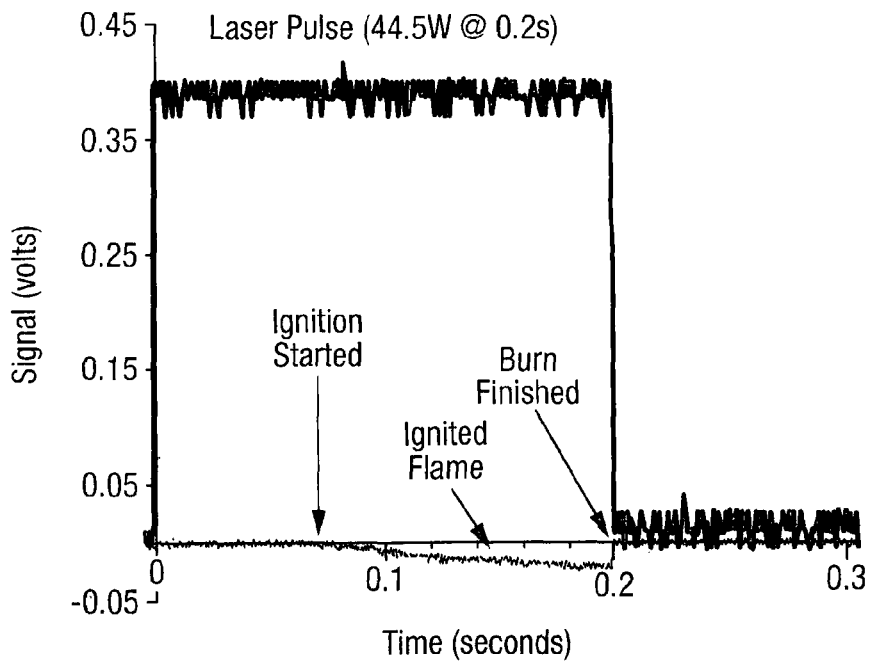

For these experiments we define self-sustaining ignition as being when the resultant flame continues after termination of the laser pulse. FIG. 4a indicates that this occurred for a laser power of 44.5 W with a pulse duration of approximately 0.3 s (equivalent to ~13 J at ~0.3 mm spot diameter); shorter laser pulses (≤0.2 s) at this power level did not achieve self-sustaining combustion (FIG. 4b). Reduction of the laser power to 25 W at a pulse duration of 0.3 s (~7.5 J, FIG. 4c) did not produce a self-sustaining burn (cf FIG. 4a). However, extending the pulse duration to 0.7 s at the same power (~17.5 J, FIG. 4d) re-established self-sustaining combustion. Thus, as would be expected, above a threshold laser power the self-sustainability of PolyPZ-6 ignition depends upon the total energy deposited into the sample (i.e. the product of the pulse duration and its intensity).

Figure 5:
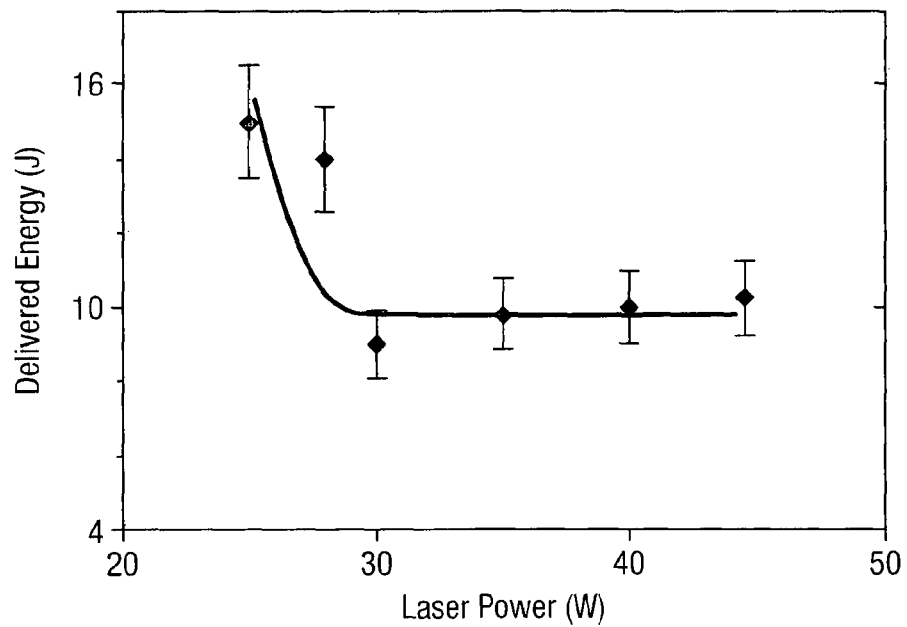
FIG. 5 shows dependence of the pulse energy required for self-sustaining ignition of PolyPZ-6, on laser power.

Nevertheless, we have observed a trade-off between laser power and pulse duration, which can facilitate ignition at lower overall energy levels. Data expressed in terms of total delivered energy (FIG. 5 & Table 21) show that the minimum pulse energy required for self-sustaining ignition reduces drastically with increasing laser power up to a value of ~30 W. Above this level the threshold for self-sustaining ignition settles at ~10 J, becoming largely independent of laser power. The increased threshold energy required at lower powers is attributed to the fact that a thermal equilibrium (between laser heating and heat loss) predominates at lower laser power levels.

Table 21 shows the duration and energy of laser pulse required for sustainable ignition at different laser powers.

TABLE 21

| | Laser power (W) | | | | | |
|---|---|---|---|---|---|---|
| | 44.5 | 40 | 35 | 30 | 28 | 25 |
| Pulse duration (ms) | 230 | 250 | 280 | 300 | 500 | 600 |
| Delivered energy (J) | 10.2 | 10 | 9.8 | 9 | 14 | 15 |

It is noted that using the maximum power available from the present laser (44.5 W) the minimum pulse duration to achieve a self-sustaining burn was ~225 ms (63 kWcm$^{-2}$). Conversely, the minimum laser power at which self-sustaining ignition could be achieved was ~25 W using a pulse duration of ≥600 ms (21 kWcm$^{-2}$, ~15 J), with a focussed beam diameter of ~0.3 mm on the target. Furthermore, it was observed that at laser powers ≤25 W, even when self-sustained flame was not observed, the sample continued to react after termination of the laser pulse such that the entire sample 'cooked off' slowly, without flame. This distinct mode of burning yields a voluminous quantity of rigid grey-black ash.

The ignition characteristics of PolyPZ-6/PolyPZ-7 blends have been quantified over a range of concentrations using the ignition delay time parameter, $\tau_d$, which is defined as the period between the start of the laser pulse and ignition of the sample. However, to avoid difficulties in identifying the precise point of ignition—which is not always well defined—the current work has assumed ignition of the sample when its optical output reaches 10% of the maximum flame intensity.

Figure 6:
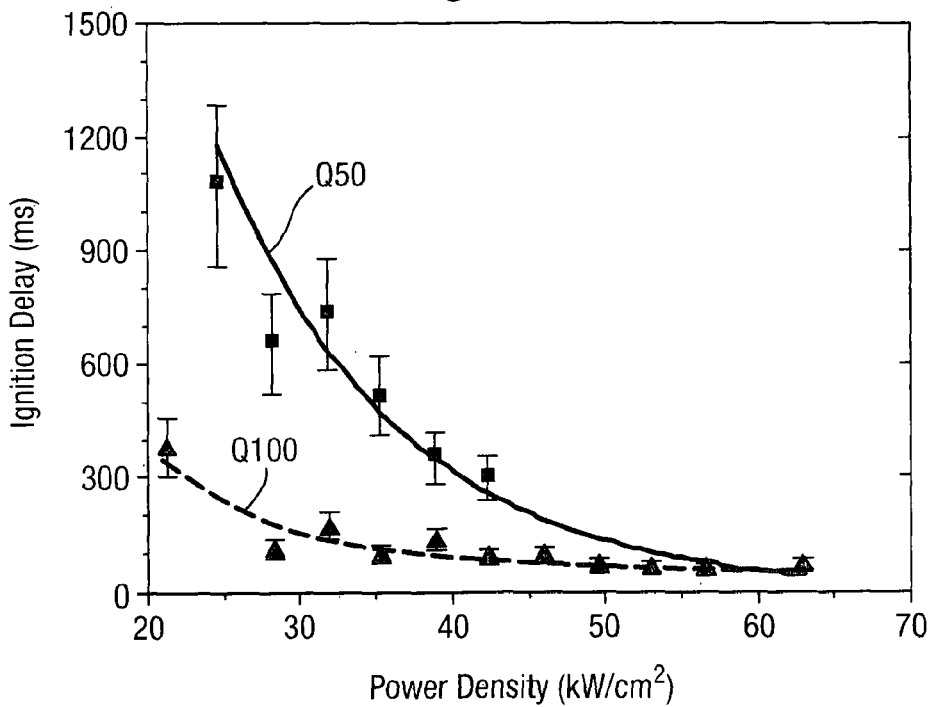
FIG. 6 shows a plot of ignition delay versus laser power density for Q100 (PolyPZ-6) and 050 (PolyPZ-6/PolyPZ-7, 50:50 wt %)[1.5 s pulse, spot size: 0.3 mm]

FIG. 6 records the responses of pure PolyPZ-6 (Q100) and Q50 under comparable experimental conditions across a range of power densities. The Figure shows that the ignition delay time reduces significantly as laser power density increases, particularly for Q50. For both samples increases in laser power eventually caused the ignition delay time to asymptote towards 90 ms, a figure which was achieved from power densities of ~60 KWcm$^{-2}$. However, the rate of change of ignition delay time with power density—between threshold and saturation conditions—was different for the two materials, being estimated as ~18 ms·cm$^2$ kW$^{-1}$ and 3 ms·cm$^2$ kW$^{-1}$ for the Q50 and Q100 samples respectively. Q50 samples produced a much longer ignition delay than Q100 samples, as would be expected from its lower optical density at 801 nm. Nevertheless, the Q50 sample was deemed to demonstrate an acceptable level of sensitization, requiring a threshold power density of ~24.8 KWcm$^{-2}$ with a minimum pulse duration of ~60 ms for sustainable ignition (17.5 W laser/0.3 mm diameter spot). It should be noted that the energy required to ignite PolyPZ-6 when formulated with an explosive is likely to be very much lower than that required to ignite the pure polymer (vide infra). As the concentration of PolyPZ-6 was further reduced, increased energy was required to ignite the binder, but at very low levels the ignition process became erratic. Thus for example Q1 containing the smallest proportion of PolyPZ-6 and hence also the lowest optical density at 801 nm would not undergo consistent ignition even at the highest available laser power level. Also, when ignition did occur, the ignition delay times were found to vary randomly from shot to shot. The minimum laser power which achieved ignition was ~30 W (~42.5 KW/cm$^{-2}$) but the burn did not self-sustain. From these data it is concluded that the absorption of Q1 at 801 nm is insufficient to reliably sensitize this material towards laser ignition at the laser power levels employed, but it is sufficient to achieve sample heating.

Table 22 shows ignition data for sample Q1 at different laser power levels (pulse duration 10 s). Triplicate tests were performed at each power level

TABLE 22

| Laser power (W) | | | | | | | | | | | | | | |
|---|---|---|---|---|---|---|---|---|---|---|---|---|---|---|
| 44.5 | | | 40 | | | 35 | | | 30 | | | 25 | | |
| 3.3 | 1.7 | * | 0.7 | 5.5 | 0.5 | 0.7 | * | 0.2 | 7.1 | 6.2 | * | * | * | * |

Ignition delay (s.)

* Ignition did not take place.

Overall these results demonstrate that PolyPZ-6 has sufficient absorption at 801 nm to facilitate its laser ignition without the need for a separate optical sensitizer, but a reasonable concentration of this material is required to effect reliable ignition. Unsurprisingly Q100, which contains the highest concentration of these chromophores shows the greatest responsiveness towards laser ignition at 801 nm, whilst Q1, with the lowest concentration, possesses such limited absorption at 801 nm that it fails to respond reproducibly to laser ignition. Nevertheless, the above data suggest that Q50 could be a practical material to employ for laser ignition. Whilst the absorbance of PolyPZ-6 at 801 nm could be enhanced by increasing the percentage of quinizarin side groups present in the polymer, thereby enhancing the ignitability of this binder, the introduction of such additional quinizarin side groups would adversely affect the oxygen balance/energy content of the polymer. However, we have found that this is likely to be unnecessary because, unexpectedly, formulations of PolyPZ-6 with HNS are much more susceptible to laser ignition than is pure PolyPZ-6 itself.

Laser Ignition of HNS IV/PolyPZ-6 Formulations

Figure 7:
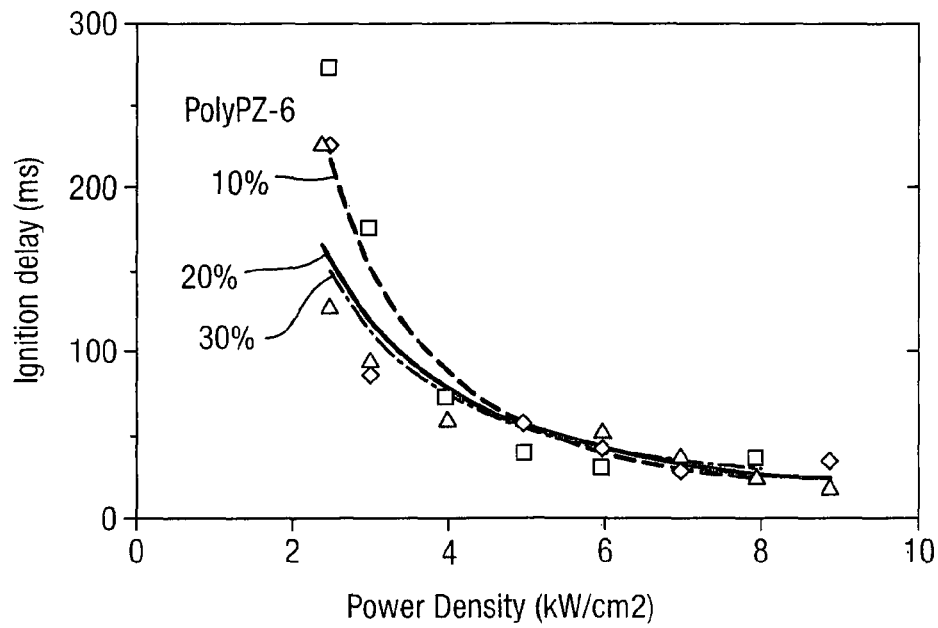
FIG. 7 shows dependence of ignition delay time on laser power density for HNS IV/PolyPZ-6 formulations (10 wt %, 20 wt % or 30 wt % binder) [300 ms pulse, spot size: 0.8 mm]

A key purpose in developing PolyPZ-6 was to utilise this material to facilitate the laser ignition of high explosives, without the need to add other optical sensitizers. In the current work we have examined the effectiveness of this binder for igniting HNS IV. Thus the laser ignitabilities of three PolyPZ-6/HNS IV formulations (containing 10 wt %, 20 wt % and 30 wt %, of binder) were examined, by recording ignition delay times across a range of laser power densities (FIG. 7). Whilst pure (unsensitized) HNS IV would not ignite even at the maximum available laser power (44.5 W), its formulations with PolyPZ-6 did ignite across a range of power densities to leave a soft black powder as residue. All three HNS/PolyPZ-6 formulations showed similar ignition threshold power densities of ~2.5 kWcm$^{-2}$. The shortest ignition delay time was achieved at ~7 kW cm$^{-2}$ with all three formulations and was estimated from the asymptotes (FIG. 4) to be ~35 msec. Unexpectedly, both of these parameters are significantly lower than those observed for pure PolyPZ-6 (threshold: ~35kWcm$^{-2}$ and minimum delay time: 225 ms at 63 kWcm$^{-2}$). Although the data for pure PolyPZ-6 and its formulations with HNS are not directly comparable, due to a change in laser spot size (PolyPZ-6: 0.3 mm, PolyPZ-6/HNS: 0.8 mm), it is clear that the PolyPZ-6/HNS formulation requires much less energy to ignite it than does pure PolyPZ-6.

Confined Ignition Tests on HNS/PolyPZ-6 Formulations

The ignition tests discussed above were all carried out under normal laboratory conditions, with only marginal confinement due to the recesses of the sample holder. Given that the combustion of most energetic materials is strongly pressure dependent, it was considered important to undertake some additional experiments under confined conditions. Thus, ignition tests were undertaken on an HNS IV/PolyPZ-6 (80/20 wt %) formulation within a confinement chamber, as described in S. R. Ahmad and D. A. Russell, 'Studies into Laser Ignition of Confined Pyrotechnics', Propellants, Explos. Pyrotech., 33, 396, 2008, which is incorporated herein by reference.

Figure 8:
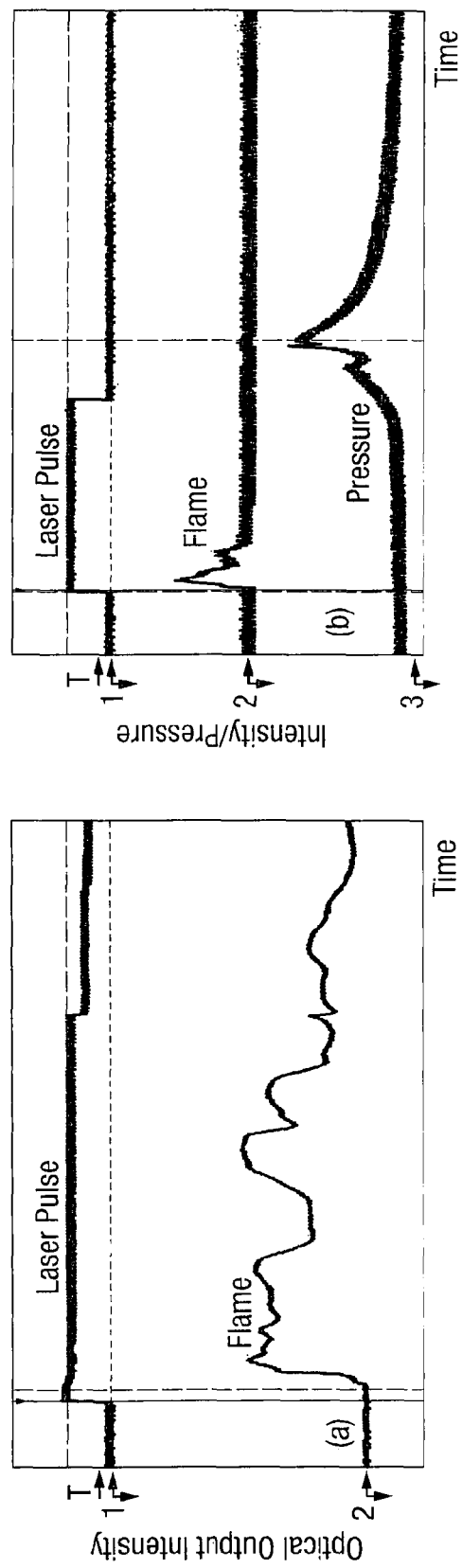
FIG. 8 shows oscilloscope traces showing flame intensity and pressure with time during a) unconfined and b) confined ignition of HNS IV/PolyPZ-6 (80:20)

Under confined conditions this formulation underwent complete combustion (44.5 W laser), but with a shorter ignition delay time (7 ms) than that observed using unconfined conditions (35 ms). After the firing a carbonaceous residue was observed in the firing chamber, but this was a soft black material unlike the rigid ashes associated with the combustion of pure PolyPZ-6. The formation of this residue reflects the relatively poor oxygen balance of the formulation. Flame intensity measurements were recorded using an oscilloscope during both confined and unconfined events; in addition pressure was also monitored during the confined burn (FIG. 8). Comparison of the traces for these confined and unconfined ignitions shows that (as expected) combustion occurs much more quickly under confined conditions. These two experiments were conducted in the same confinement chamber, but respectively with and without the sealing cap in place. Table 23 shows ignition delay and pressure peak time under confined ignition

TABLE 23

| Laser power (W) | 45 | 35 | 25 | 15 | 8 |
|---|---|---|---|---|---|
| Ignition delay (ms) | 6.8 | 25 | 22 | — | — |

Figure 9:
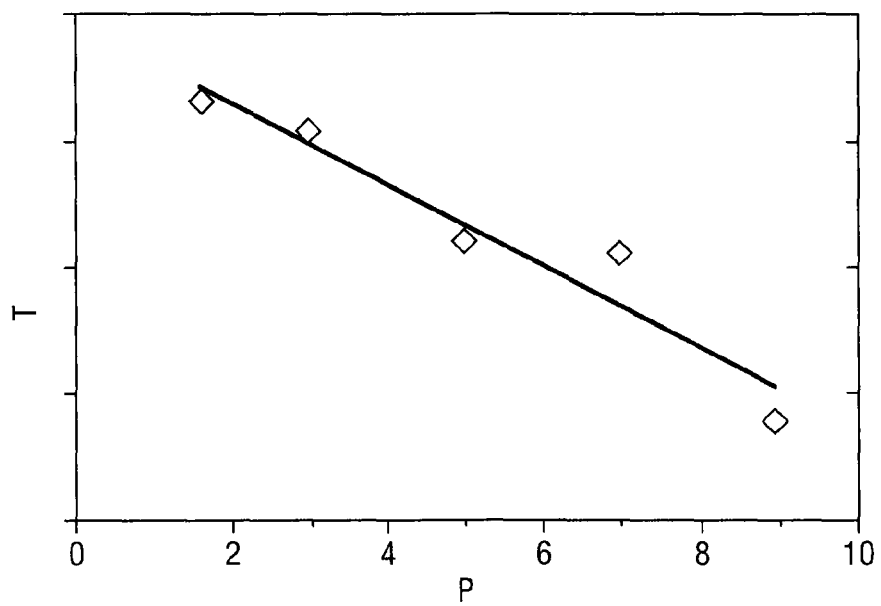
FIG. 9 shows a plot of time delay to peak pressure (T—arbitrary units) versus power density (P, $W/cm^2$) for the confined ignition of PolyPZ-6/HNS IV (80:20).

Additional confined tests were undertaken across a range of laser powers. However, lower power levels produced slower ignitions, which under confined conditions lead to obstruction of the optical fibre by black smoke. This made it impossible to observe the ignition effectively. Table 23 records the ignition delay times observed at various laser powers. The time taken to achieve peak pressure was found to decrease linearly with increasing power density (FIG. 9).

The optical absorption of PolyPZ-6 at 801 nm and the susceptibility of this material to laser ignition are both strongly dependant upon the concentration of quinizarin functionalities present in the binder. Consequently pure PolyPZ-6 (Q100) is the most responsive to laser ignition at this wavelength, but Q50 (equivalent to a molecule possessing ~1% quinizarin moieties in the backbone) is thought to offer acceptable ignition performance. Where the concentrations of PolyPZ-6/quinizarin functionalities fall significantly below those present in Q50, the binder produces significant heating of the formulation, but tends to produce erratic ignition behaviour when using the laser power densities available with the current experimental equipment. (Higher power lasers should produce sustainable ignition at lower concentrations of PolyPZ-6/quinizarin functionalities.)

Unexpectedly, much less energy is required to ignite PolyPZ-6 when it is formulated with HNS (~0.4 J), than when it is present as the pure binder (~10 J). This means that the ignition of PolyPZ-6/HNS formulations is much more energy efficient than that of pure PolyPZ-6 alone. This feature offers a clear advantage when seeking to ignite an explosive material in a practical weapon system. As would be expected both ignition delay and combustion times are shorter when the sample is confined than when it is unconfined.

Such a material may equally be used to ignite other explosive compounds including propellants and pyrotechnics. PolyPZ-6 is the first example of an energetic binder with these characteristics.

Alternative Materials and Examples

PolyPZ-5 [P-(2,2,2-trifluoroethan-1-oxy)/(5,6-dinitratohexan-1oxy/3-amino propan-1-oxy/N-(1'-hydroxyanthracene-9',10'-dione-4'-yl)-3-aminopropan-1-oxy) polyphosphazene] possesses similar properties to PolyPZ-6 with respect to laser ignition, for example by a NIR laser. However, as this material slowly self-cures once the solvent has been removed it is convenient to formulate this polymer using a solvent. This capability to self-cure can beneficially promote cross-linking in blends of PolyPZ-5 with other binders (e.g. with PolyPZ-7). However, if such a curing functionality is not required, the reactive amine groups present in PolyPZ-5 may be 'capped off' using the procedure described in this patent, to yield PolyPZ-6. The same objective may be achieved by using a similar procedure, with a variety of alternative isocyanates.

It should be noted that whilst PolyPZ-6 [P-(2,2,2-trifluoroethan-1-oxy (14%)/(5,6-dinitratohexan-1-oxy (75%)/4,6-diaza-5-oxododecan-1-oxy (9%)/N-(1'-hydroxyanthracene-9',10'-dione-4'-yl)-3-aminopropan-1-oxy (2%)) polyphosphazene] contains only 2% of the optically active quinizarin structure, it is possible to incorporate higher proportions of this functionality by increasing the proportion of leucoquinizarin reacted with PolyPZ-4/extending the reaction times used' (and also optionally by increasing the degree of 3-aminopropan-1-oxy side group substitution in the PolyPZ-4). The degree of substitution by quinizarin moieties is also affected by the relative proportions of other substituents and the preparation of one sample of PolyPZ-5 having enhanced quinizarin content is described in the experimental section. (Brittle solid, [P-(2,2,2-triftuoroethan-1-oxy (8%)/(5,6-dinitratohexan-1oxy (55%)/3-amino propan-1-oxy (30%)/N-(1'-hydroxyanthracene-9',10'-dione-4'-yl)-3-aminopropan-1-oxy (7%) polyphosphazene]. This material which is the precursor to PolyPZ-6, contains a much higher percentage of quinizarin functionality and will therefore demonstrate significantly higher optical absorption, leading to more effective laser ignition.) However, because this material is a solid, its application as an optical sensitizer is best effected by dissolving it in solvent, such as acetone or THF, and then coating this solution onto, for example, explosives and then evaporating the solvent before use. Alternatively this polymer may be blended with other energetic binders, such as, PolyPZ-7 in presence of a solvent (which is subsequently removed); this blended binder can then be used to formulate with explosives etc. thereby causing optical sensitisation. PolyPZ-5 may of course be converted to PolyPZ-6 and used in a similar fashion if it is desired to employ a product which does not undergo self-cure.

Confined Ignition of GUDN/PolyPZ-6

Pure GUDN (Guanylurea Dinitramide, FOX-12, GUDN—Class 2 (NSG 120, mean particle size 147 μm, EURENCO Bofors, Sweden) would not ignite even at the highest available laser power (44.5 W). This material was therefore formulated with 20 wt % of PolyPZ-6 (i.e. Q100) using the same Procedure as described above for HNS. When this formulation was exposed to laser radiation (801 nm) under confined conditions (laser power 44.5 W, 0.8 mm dia spot size) the formulation ignited in the region where the laser impinged upon the sample, but there was no propagation of combustion through the remainder of the material. This result indicates the attainment of laser supported combustion—where the composition only burns sustainably whilst it is illuminated by the laser beam. This result probably reflects (in part) the high stability of GUDN, which makes it difficult to achieve sustainable ignition. The use of a higher power laser and/or an increased level of quinizarin substitution within the PolyPZ-6 should improve the ignitability of this formulation.

For ease of reference, a list of the names of the polyphosphazenes referred to in this application are given below along with their chemical structures.

Structure, Designation and Name

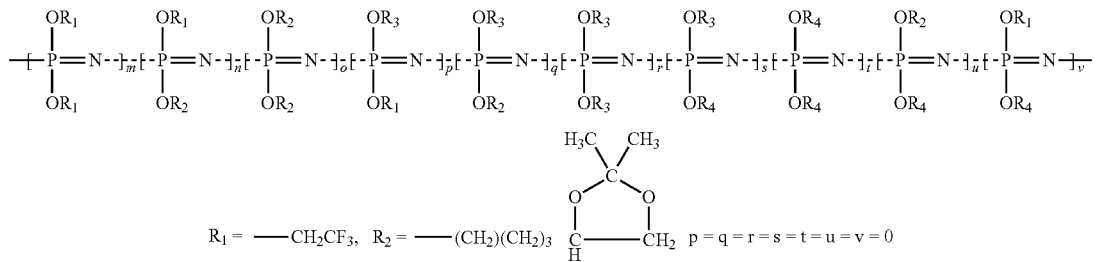

PolyPZ-1
[P-((2,2,2-trifluoroethan-1-oxy/4-(2',2'-dimethyl-1'-3'-dioxolan-4'-yl)-butan-1-oxy)]

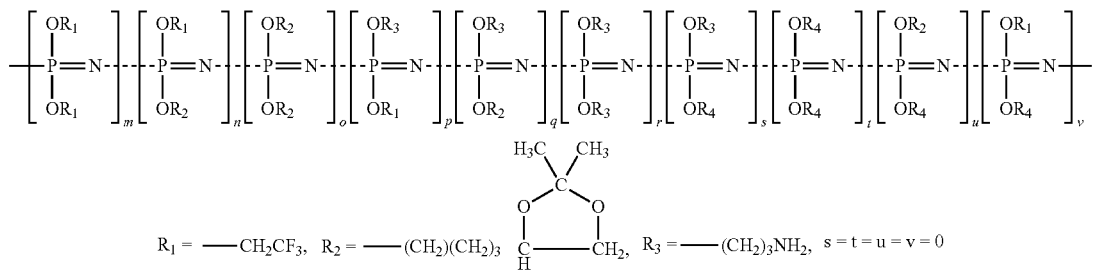

PolyPZ-2
[P-(2,2,2-trifluoroethan-1-oxy/4-(2',2'-dimethyl-1'-3'-dioxolan-4'-yl)-butan-1-oxy)/3-aminopropan-1-oxy polyphosphazene]

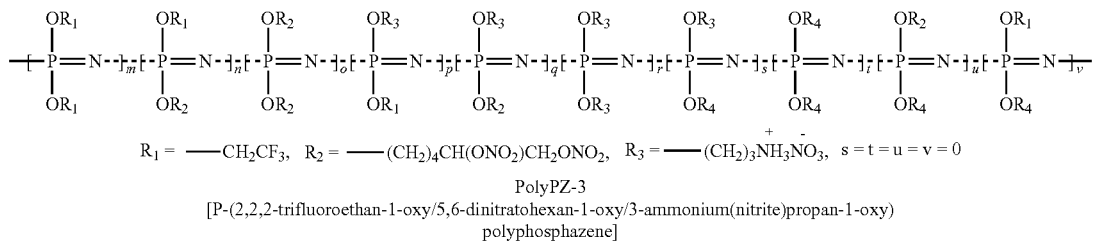

PolyPZ-3
[P-(2,2,2-trifluoroethan-1-oxy/5,6-dinitratohexan-1-oxy/3-ammonium(nitrite)propan-1-oxy) polyphosphazene]

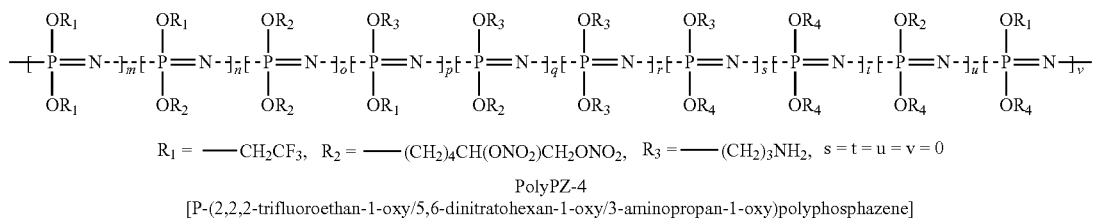

PolyPZ-4
[P-(2,2,2-trifluoroethan-1-oxy/5,6-dinitratohexan-1-oxy/3-aminopropan-1-oxy)polyphosphazene]

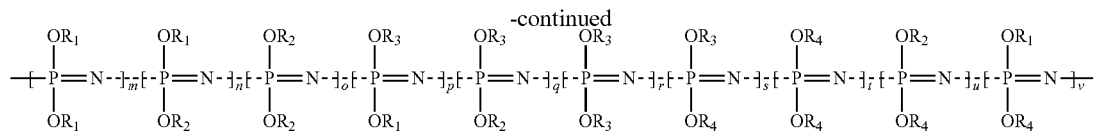

R₁ = —CH₂CF₃, R₂ = —(CH₂)₄CH(ONO₂)CH₂ONO₂, R₃ = —(CH₂)₃NH₂,

R₄ =

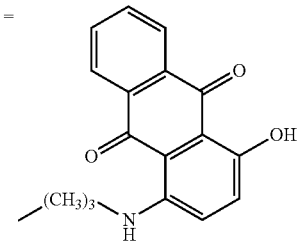

PolyPZ-5
[P-(2,2,2-trifluoroethan-1-oxy/(5,6-dinitratohexan-1-oxy/3-amino propan-1-oxy/N-(1'-hydroxyanthracene-9',10'-dione-4'-yl)-3-aminopropan-1-oxy) polyphosphazene]

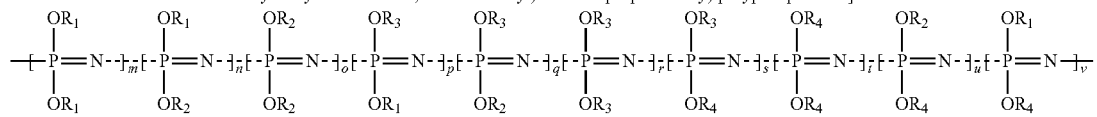

R₁ = —CH₂CF₃, R₂ = —(CH₂)₄CH(ONO₂)CH₂ONO₂, R₃ = —(CH₂)₃NHC(O)NH(CH₂)₅CH₃,

R₄ =

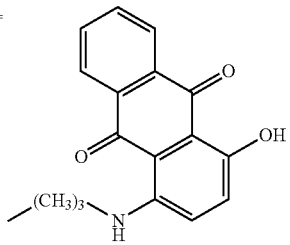

PolyPZ-6
[P-(2,2,2-trifluoroethan-1-oxy/(5,6-dinitratohexan-1-oxy/4,6-diaza-5-oxododecan-1-oxy/N-(1'-hydroxyanthracene-9',10'-dione-4'-yl)-3-aminopropan-1-oxy) polyphosphazene]

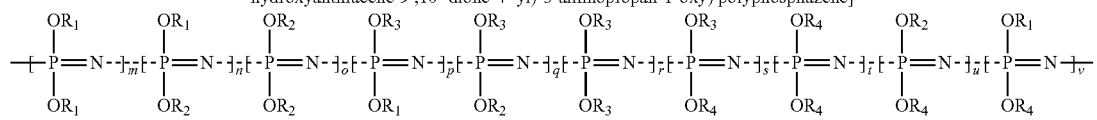

R₁ = —CH₂CF₃, R₂ = —(CH₂)₄CH(ONO₂)CH₂ONO₂, p = q = r = s = t = u = v = 0

PolyPZ-7
[P-(2,2,2-trifluoroethan-1-oxy/5,6-dinitratohexan-1-oxy/polyphosphazene]

The invention claimed is:

1. An optically sensitised binder which is an energetic polyphosphazene tailored at the molecular level to achieve enhanced absorption of electromagnetic radiation by having attached thereto a chromophore to absorb light and therefore ignite the binder in use, the binder comprising a combination of units having one or more of the structures (i) to (iii),

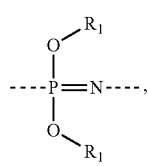

(i)

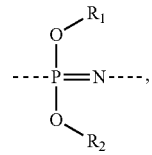

(ii)

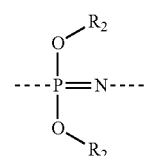

(iii)

wherein: the combination comprises R₁ and R₂;
each R₁, is independently a side chain containing a chromophore; and each $R_2$ is independently an energetic side chain,
wherein at least one $R_2$ contains nitramine, nitrate ester, azide, an ammonium compound moiety with energetic counter-ion, or combinations thereof.

2. The binder of claim 1, wherein at least one $R_1$ and/or at least one $R_2$ comprises an optionally substituted alkyl- or alkyl ether-based bridging group having 1 to 10 carbon atoms.

3. The binder of claim 1, wherein at least one $R_2$ comprises one or more of:
$C_{1-18}$(alkyl)CH(ONO$_2$)CH$_2$(ONO$_2$); $C_{1-18}$(alkyl)CH(N$_3$)CH$_2$(N$_3$); $C_{1-18}$(alkyl)CH$_2$(N$_3$); $C_{1-19}$(alkyl)CH$_2$(ONO$_2$); and an alkyl or alkyl ether based ammonium compound side chain with an energetic counter ion; or combinations thereof.

4. The binder of claim 1, wherein the chromophore absorbs, or is suitable for enhancing the absorption of, radiation having a wavelength in the range of from 600 to 1000 nm.

5. The binder of claim 1, wherein the chromophore is selected and attached in an amount sufficient to allow the binder to be more readily ignited by light generated by laser or flash tubes.

6. The binder of claim 1, wherein the chromophore is selected and attached to provide a binder which is ignitable by a diode laser with a power of 44.5 W at 801 nm wavelength, a pulse duration of approximately 0.3 s, with the laser beam being focussed to produce a nominal beam spot size of 0.3 mm diameter on a sample surface.

7. The binder of claim 1, wherein the chromophore is selected from, azo-dyes, diphenylmethane dyes, triphenylmethane dyes, xanthen dyes, diphenylamine (quinone-imine) dyes), heterocyclic dyes, vat dyes, anthraquinod dyes, sulphur dyes, and phthalocyanine dyes.

8. The binder of claim 1, wherein the chromophore is an anthraquinod dye.

9. The binder of claim 1, wherein the chromophore is a N-(1'-hydroxyanthracene-9',10'-dione-4'-yl)-3-aminopropan-1-oxy side chain.

10. The binder of claim 1, wherein the chromophore comprises a conjugated energetic counter-ion.

11. The binder of claim 10, wherein the counter ion is a tri- or tetrazolonate.

12. The binder of claim 1, being a compound further comprising one or more units having one or more of the structures (iv) to (vi)

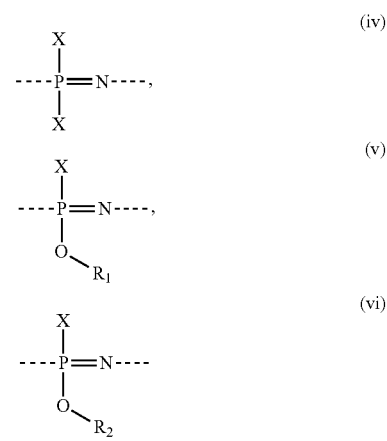

wherein $R_1$ and $R_2$ are as defined in claim 2; and each X is a pendant group residual from synthesis of the compound.

13. The binder of claim 12, wherein each X is independently selected from $C_{1-20}$ fluoroalkoxy or fluoroalkoxy ether; $C_{1-20}$ aminoalkoxy and; $C_{1-20}$ protected aminoalkoxy.

14. The binder of claim 1, wherein the energetic polyphosphazene comprises no further groups or units.

15. The binder of claim 1, wherein the energetic polyphosphazene consists of units having structures (i) to (iii) as defined in claim 3 and optionally units having structures (iv) to (vi) as defined in claim 2.

16. The binder of claim 1, comprising in the range of from 0.5% to 15% of chromophore groups or side chains containing $R_1$.

17. The binder of claim 1 having the structure Poly PZ-5:

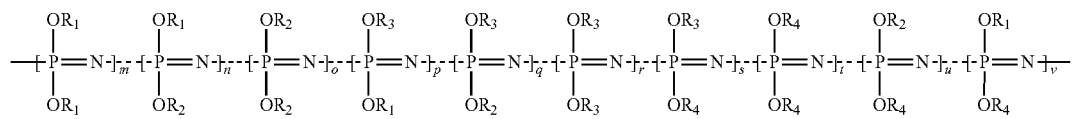

$R_1 =$ —CH$_2$CF$_3$, $R_2 =$ —(CH$_2$)$_4$CH(ONO$_2$)CH$_2$ONO$_2$, $R_3 =$ —(CH$_2$)$_3$NH$_2$,
$R_4 =$

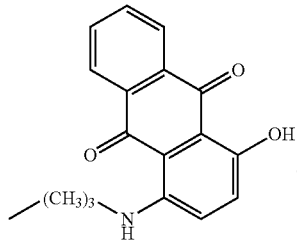

PolyPZ-5

18. The binder of claim 1, having the structure Poly PZ-6:

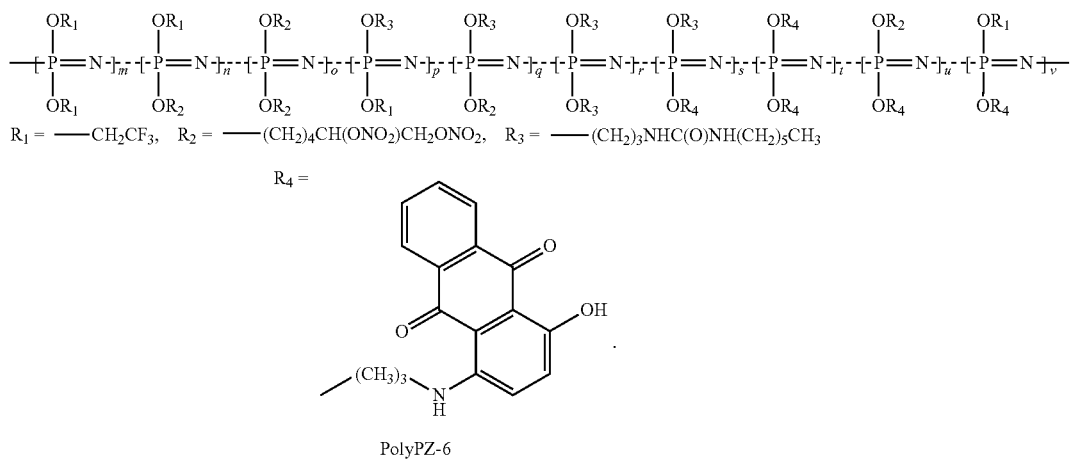

$R_1 =$ —$CH_2CF_3$,  $R_2 =$ —$(CH_2)_4CH(ONO_2)CH_2ONO_2$,  $R_3 =$ —$(CH_2)_3NHC(O)NH(CH_2)_5CH_3$ $R_4 =$

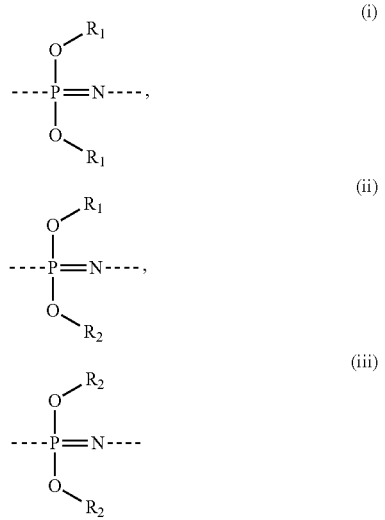

PolyPZ-6

19. A method for the synthesis of a binder according to claim 1, the binder comprising a compound with a combination of units having one or more of the structures (i) to (iii), (i)
```
      R₁
    O/
    |
----P=N----,
    |
    O\
      R₁
```

(ii)
```
      R₁
    O/
    |
----P=N----,
    |
    O\
      R₂
```

(iii)
```
      R₂
    O/
    |
----P=N----
    |
    O\
      R₂
``` wherein: the combination comprises $R_1$ and $R_2$;
each $R_1$ is independently a side chain containing a chromophore; and
each $R_2$ is independently an energetic side chain,
the method comprising providing a substitutable poly(phosphazene) backbone; attaching a pendant chromophore group —O—$R_1$, or a precursor thereof, to the backbone via nucleophilic substitution with an alkoxide; attaching a pendant energetic group —O—$R_2$, or a precursor thereof, to the backbone via nucleophilic substitution with an alkoxide; and converting at least part of any precursor into the relevant pendant group.

20. The method of claim 19, comprising the sequential steps of: attaching nitratable precursor groups of —O—$R_2$ to the backbone; attaching aminoalkoxy groups to the backbone; nitrating to convert the precursor groups to nitratoalkoxy groups, forming —O—$R_2$, and to convert the aminoalkoxy groups into ammonium nitrate alkoxy groups; reconverting the ammonium nitrate alkoxy groups to aminoalkoxy groups and reacting the aminoalkoxy groups with a chromophore to form —O—$R_1$.

21. The method of claim 20, wherein a first subset of the ammonium nitrate alkoxy groups is reacted with the chromophore to form —O—$R_1$ and a remaining subset of the aminoalkoxy groups is capped off with a protecting group.

22. A method of using a binder of claim 1, comprising including the binder as an energetic binder/co-binder/ingredient in explosives, pyrotechnic compositions or propellant compositions.

23. A method of igniting or combusting a binder according to claim 1, the method comprising irradiating the binder with an effective amount of electromagnetic radiation.

24. The method of claim 23, wherein the binder is irradiated to achieve combustion supported by the irradiation.

25. The method of claim 23, wherein the binder is irradiated to effect self-sustaining ignition.

* * * * *

UNITED STATES PATENT AND TRADEMARK OFFICE
CERTIFICATE OF CORRECTION

| | | |
|---|---|---|
| PATENT NO. | : 9,605,114 B2 | Page 1 of 1 |
| APPLICATION NO. | : 14/408184 | |
| DATED | : March 28, 2017 | |
| INVENTOR(S) | : Peter Golding, Anthony John Bellamy and Alessandro Enzo Contini | |

It is certified that error appears in the above-identified patent and that said Letters Patent is hereby corrected as shown below:

In the Claims

Column 26, Line 37:
"15. The binder of claim 1, wherein the energetic polyphosphazene consists of units having structures (i) to (iii) as defined in claim 3 and optionally units having structures (iv) to (vi) as defined in claim 2." should be corrected to read -- 15. The binder of claim 1, wherein the energetic polyphosphazene consists of units having structures (i) to (iii) as defined in claim 1 and optionally units having structures (iv) to (vi) as defined in claim 12. --

Signed and Sealed this
Twenty-fifth Day of July, 2017

Joseph Matal
*Performing the Functions and Duties of the*
*Under Secretary of Commerce for Intellectual Property and*
*Director of the United States Patent and Trademark Office*